(12) United States Patent
Baykal et al.

(10) Patent No.: US 8,964,572 B2
(45) Date of Patent: Feb. 24, 2015

(54) DETERMINING QUALITY OF EXPERIENCE WITH A NETWORK DEVICE

(71) Applicant: Calix, Inc., Petaluma, CA (US)

(72) Inventors: Berkay Baykal, Newton, MA (US); Shaun N. Missett, Avon, CT (US); Ari M. Sodhi, Markham (CA)

(73) Assignee: Calix, Inc., Petaluma, CA (US)

( * ) Notice: Subject to any disclaimer, the term of this patent is extended or adjusted under 35 U.S.C. 154(b) by 176 days.

(21) Appl. No.: 13/627,582

(22) Filed: Sep. 26, 2012

(65) Prior Publication Data
US 2014/0086073 A1 Mar. 27, 2014

(51) Int. Cl.
*H04J 1/16* (2006.01)
*H04L 12/24* (2006.01)
*H04L 12/26* (2006.01)

(52) U.S. Cl.
CPC ........ *H04L 41/5038* (2013.01); *H04L 43/0894* (2013.01)
USPC .......................................... 370/244; 370/252

(58) Field of Classification Search
CPC ....................... H04L 41/5038; H04L 43/0894
USPC .................................................. 370/252, 244
See application file for complete search history.

(56) References Cited

U.S. PATENT DOCUMENTS

2003/0108178 A1* 6/2003 Nguyen et al. ........... 379/220.01
2005/0254431 A1* 11/2005 Sills .............................. 370/241

OTHER PUBLICATIONS

Dimetis GmbH, "QoE and QoS monitoring for IPTV—a different approach," dimetis® Intergrierte SystemLosungen, 5 pages, Jun. 2007.
Products and Solutions Overview, QoS Challenges and Solutions, GoS Networks Ltd., 7 pages, Jan. 13, 2011, http://www.slideshare.net/GoSNetworks/gos-networks.
GoS Monitoring and Assurance, 360° Visibility of Network and Application Performance, GOS Networks Limited, 2 pages, retrieved on Jun. 22, 2012.
Active quality of Experience, Verification for Multiplay Service with 1xRave, IXIA®, Revision A, 18 pages, Mar. 2009.

* cited by examiner

*Primary Examiner* — Sai-Ming Chan
(74) *Attorney, Agent, or Firm* — Shumaker & Sieffert, P.A.

(57) ABSTRACT

A demarcation point device positioned at a customer network to provide the customer network access to a service provider network. The demarcation point device comprises a control unit that transmits one or more service query data packets on the customer network to test at least one service within the customer network. The control unit receives one or more service reply data packets from the customer network in response to transmitting the service query data packets, and determines one or more service statistics based on one or more of the service query data packets and the service reply data packets.

31 Claims, 6 Drawing Sheets

QoE Monitoring Website

Data Service Quality

| | MDI |
|---|---|
| Service Provider Network | GREEN | 10:0 |
| Customer Network | GREEN | 10:0 |

VoIP Service Quality

| | MOS |
|---|---|
| Service Provider Network | GREEN | 5 |
| Customer Network | YELLOW | 3.5 |

IPTV Service Quality

| | MDI |
|---|---|
| Service Provider Network | GREEN | 10:0 |
| Customer Network | YELLOW | 50:2 |

Consumer Level Metrics

| | |
|---|---|
| Time to Download MP3 File (10 MB) | 11.43 sec |
| Time to Download HD Movie (2 GB) | 29 min 10 sec |
| Time to Initiate Streaming Video | 0.45 sec |
| Time to upload a file (1 MB) | 1.25 sec |
| Time to download a file (1 MB) | 0.88 sec |
| Time to download a Webpage (2 MB) | 1.76 sec |
| Streaming Media Quality | Green |
| Online Gaming Experience Quality | Green |
| Quality of Application 1 | Green |
| Quality of Application 2 | Yellow |

Network Statistics

| | | Service Provider Network | Customer Network |
|---|---|---|---|
| Latency | | 100 ms | 150 ms |
| Jitter | | -40 ms | -50 ms |
| Loss % | | 2% | 10% |
| Bandwidth Utilization | | 10% | 50% |
| | CPE Device 1 | | 29% |
| | CPE Device 2 | | 7% |
| | CPE Device 3 | | 3% |
| | CPE Device 4 | | 1% |
| Max Bit Rate | | 7 Mbps | 15 Mbps |
| Other 1 | | X | X |
| Other 2 | | Y | Y |

Click Here to INITIATE TEST

| | | |
|---|---|---|
| Service Provider | Data | |
| | VoIP | |
| | IPTV | |
| Customer | Data | |
| | VoIP | |
| | IPTV | |

FIG. 4

DETERMINING QUALITY OF EXPERIENCE WITH A NETWORK DEVICE

TECHNICAL FIELD

This disclosure relates to computer networks and, more particularly, to demarcation point devices in computer networks.

BACKGROUND

A service provider (SP) network typically connects a number of different types of computer networks to one another. One type of network, referred to as a customer network enables so-called "customer premises equipment" or "CPE" (which may also be referred to as "subscriber devices") to access the service provider network. Generally, a service provider network comprises multiple customer networks. The provider often delivers multiple network services to customer networks. For example, the provider may provide Internet access to a customer network by connecting the customer network to a large number of public networks generally referred to collectively as the "Internet." In addition, the provider may offer Voice over Internet Protocol (VoIP) telephone service and Internet Protocol Television (IPTV) service.

The provider may offer network services to customers in various tiers and with each tier, guarantee a different level of Quality of Service (QoS). For example, service providers may offer a tier 1 Internet connection for a higher cost that in return guarantees high bandwidth, low latency, and high reliability to the customer. Tier 1 Internet access may be suitable for a large enterprise customer. The service provider may also offer tier 2 and tier 3 Internet access packages that guarantee lower bandwidth, higher latency, and lower reliability network access in exchange for lower cost as compared to the tier 1 packages. For example, a tier 2 Internet access package may be suitable for small enterprises or businesses that value quality network access and reliability but not at the price point of a tier 1 package. A tier 3 package may be suitable for residential customers that are typically on a much smaller budget than a business and only need Internet access for browsing and simple online game play. The provider designs the service provider network to meet the QoS requirements of each type and tier of service offered.

Achieving QoS requirements on the service provider network does not guarantee how customers will perceive each service received on a customer network, i.e. the Quality of Experience (QoE) for each service. The QoE for each service varies across customer networks because customer networks are complex, unique, and have many parameters that impact the QoE that are outside the control of the service provider. For example, the customer network may include multiple distribution networks, including a category 5 (CAT5) wired network, a wireless data network, a coaxial (which may be referred to as "COAX") wired network, and a network for providing power throughout the customer premises (which may be co-opted for wired networking). The customer network may also include a large number and variety of customer premises equipment (CPE) that is in concurrent use at any given time. CPE may include Internet-ready televisions, non-Internet-ready televisions, set-top boxes (STBs), gaming consoles, personal media players, digital video disc (DVD) players, Blu-ray players, desktop computers, laptop computers, slate or tablet computers, traditional telephones, Voice over Internet Protocol (VoIP) telephones, mobile phones, global positioning system (GPS) devices, wireless access points (WAPs), switches, hubs, printers, servers, Ethernet-over-power bridges, Ethernet-over-coaxial bridges, storage devices, and any other similar devices commonly employed by customers to access one or more of the services provided by service provider network. Uniqueness of customer networks and variables in CPE may affect customer's perceived QoE.

While customers may not continuously monitor QoE, when services appear to be degraded, customers commonly assume that the degradation in the services occurs as a result of issues within the service provider network. Customer then may contact the service provider requesting that these issues be resolved so that that delivery of services can be restored. However, given the increasing complexity of customer networks, the service provider often struggles to isolate the issue in service delivery to either the service provider network or the customer network. Failing to isolate the issues may prevent resolution of these issues without having to send a technician to the customer's premises, which is costly and severely degrades the customer's perception of the service provider.

SUMMARY

In general, techniques are described to measure, with a demarcation point device (DPD), Quality of Experience (QoE) of a service running on a customer network to facilitate troubleshooting of issues with delivery of services both to and within the customer network. The techniques may enable a demarcation point device to operate as a test server to test the delivery of services through a customer network. Rather than test delivery of services with a server located in a back office of the service provider network (or, more commonly, located in the Internet), the techniques may enable testing of delivery of one or more services within a customer network. In this way, the techniques may test the customer network without introducing variables associated with the service provider network and Internet, thereby enabling the service provider to remotely isolate issues with delivery of the services. The techniques may further enable a demarcation point device to operate as a test client to test QoE for delivery of services through a service provider network. A QoE test server may initiate a test with the demarcation point device acting as a test client to test delivery of one or more services within the service provider network. The techniques may provide QoE information regarding an individual customer network or service provider network leading up to the individual customer network (which is often referred to as an "access network"). The techniques may further enable the demarcation point device to provide QoE information (both with respect to the customer network and the access network) to the back office of the service provider to facilitate troubleshooting of issues with the delivery of service to the customer and within the customer network.

A DPD may therefore provide a controlled environment to monitor QoE of a customer network without introducing variables from the service provider access network that may impact the monitored QoE. The DPD may allow a service provider (or customer) to perform specific QoE tests in order to obtain accurate QoE statistics on a per service basis. Such statistics and monitoring may be useful in diagnosing and troubleshooting issues experienced at a customer network. The techniques may further enable the DPD and the QoE test server, to display these statistics to customers operating the customer network in a more understandable form, such as by reporting an average time to download a music file (e.g., a motion picture experts group (MPEG) 1 or 2 Audio Layer 3 (MP3) file), an average time to download a high definition (HD) video file, etc. By reporting these statistics in this manner, customers may more readily understand the impact of the service degradation.

In one example, the disclosure is directed to a method. The method comprises transmitting, with a demarcation point device positioned at a customer network to provide the customer network access to a service provider network, one or more customer query data packets via the customer network to test at least one service within the customer network. In response to transmitting the one or more customer query data packets, the method further comprises receiving, with the demarcation point device, one or more customer reply data packets from the customer network. The method further comprises determining, with the demarcation point device, one or more customer network statistics based on one or more of the customer query data packets and the customer reply data packets.

In another example, the disclosure is directed to a demarcation point device positioned at a customer network to provide the customer network access to a service provider network. The demarcation point device comprises a control unit that transmits one or more customer query data packets on the customer network to test at least one service within the customer network. The control unit receives one or more customer reply data packets from the customer network in response to transmitting the customer query data packets, and determines one or more customer network statistics based on one or more of the customer query data packets and the customer reply data packets.

In another example, the disclosure is directed to a network system. The network system comprises a customer network, a service provider network that provides one or more services, a demarcation point device positioned at the customer network to provide the customer network access to the service provider network, and a quality of experience test server positioned at the service provider network. The demarcation point device includes a control unit that transmits one or more customer query data packets on the customer network to test at least one service within the customer network, receives one or more customer reply data packets from the customer network in response to transmitting the customer query data packets, and determines one or more customer network statistics based on one or more of the customer query data packets and the customer reply data packets. The quality of experience test server includes a control unit that transmits a command to test the at least one service to the demarcation point device via the service provider network, receives the one or more customer network statistics from the demarcation point device, and presenting the one or more customer network statistics on a webpage hosted by the quality of experience test server so that one or more of a customer that operates the customer network or an operator of the service provider network are able to view the customer network statistics.

In another example, the disclosure is directed to a computer-readable storage medium. The non-transitory computer readable medium comprises instructions that, when executed, cause one or more processors to transmit, with a demarcation point device positioned at a customer network to provide the customer network access to a service provider network, one or more customer query data packets via the customer network to test at least one service within the customer network, in response to transmitting the one or more customer query data packets, receive, with the demarcation point device, one or more customer reply data packets from the customer network, and determine, with the demarcation point device, one or more customer network statistics based on one or more of the customer query data packets and the customer reply data packets.

In another example, the disclosure is directed to a demarcation point device that comprises means for transmitting, with the demarcation point device positioned at a customer network to provide the customer network access to a service provider network, one or more customer query data packets via the customer network to test at least one service within the customer network. In response to transmitting the one or more customer query data packets, the demarcation point device further comprises means for receiving, with the demarcation point device, one or more customer reply data packets from the customer network. The demarcation point device further comprises means for determining, with the demarcation point device, one or more customer network statistics based on one or more of the customer query data packets and the customer reply data packets.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 4 is an example illustration of a webpage of a quality of experience monitoring website hosted by the quality of experience test server shown as part of the network system in the example of FIG. 1.

DETAILED DESCRIPTION

Figure 1:
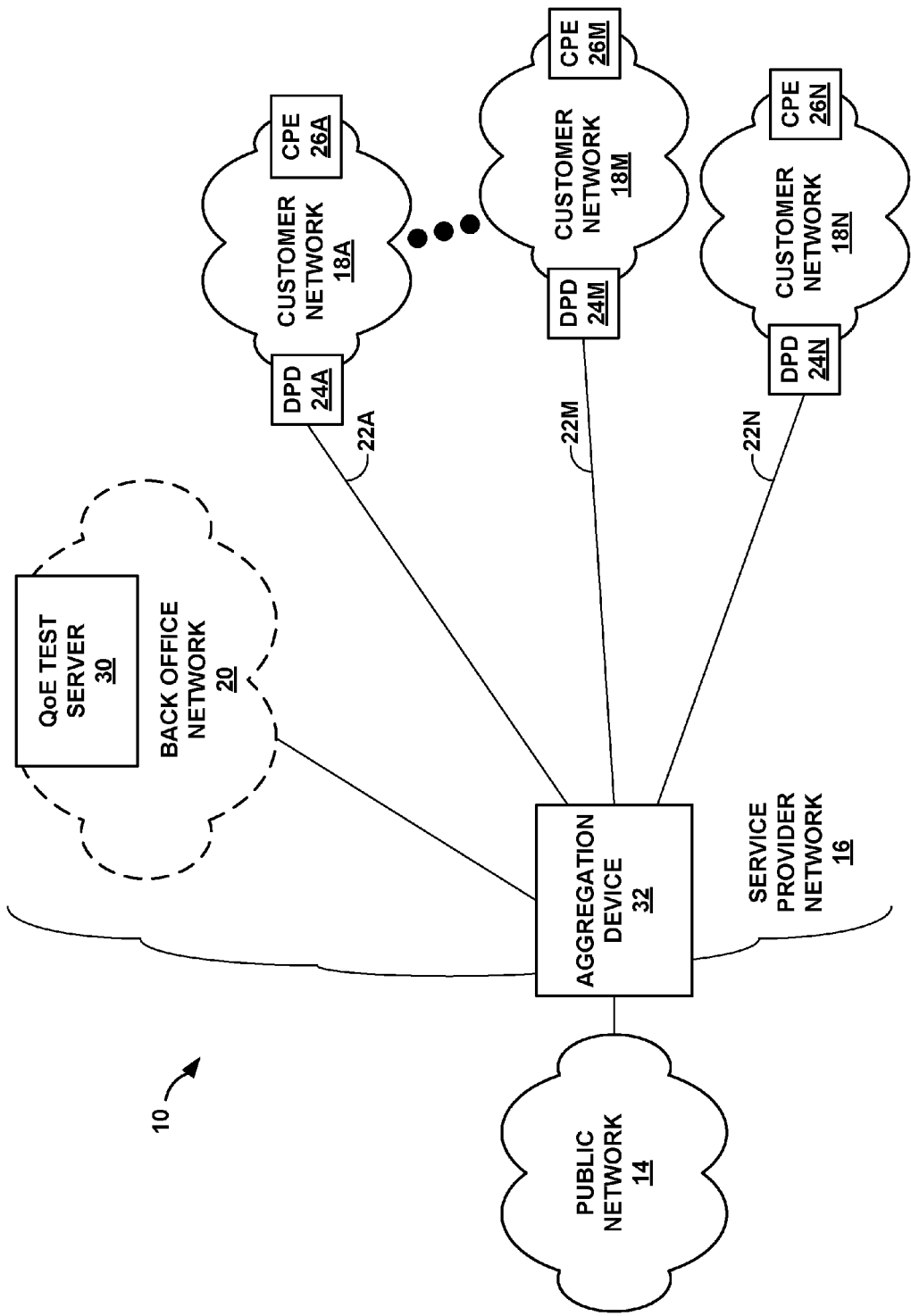
FIG. 1 is a block diagram illustrating an example network system that includes demarcation point devices that each may implement the service testing techniques described in this disclosure.

FIG. 1 is a block diagram illustrating an example network system 10 that includes demarcation point devices (24A-24N) that each may implement the service testing techniques described in this disclosure. In the example of FIG. 1, network system 10 includes a public network 14 and a service provider network 16. Public network 14 represents any type of network that is made available for general public access. Public network 14 may generally represent what is commonly referred to as the "Internet." While shown as a single network, public network 14 may comprise one or more networks that are each interconnected to form public network 14. Public network 14 may be referred to as a "packet-switched" network in that network 14 operates according to a layer three (L3) network protocol that divides and routes data in the form of packets, which are effectively switched through network 14. References to a layer followed by a number refer to a layer of the Open Systems Interconnection (OSI) model.

Service provider network 16 may represent a network that is owned and operated by a service provider to enable delivery of services to customer networks (18A-18N) ("customer networks 18"). Commonly, service provider network 16 offers one or more of a data or so-called "Internet" service by which these customers may interface with public network 14, a television service (such as a cable television service or Internet Protocol Television (IPTV) service), and a telephone service (either by way of a plain old telephone system (POTS), which is often referred to as a "landline" service or as a Voice over Internet Protocol (VoIP) service). A service provider that owns and operates service provider network 16 may provide the infrastructure by which to provide one or more of the above noted services in addition to providing one or more of the above noted services. Competing service providers may also contract with the service provider that owns and operates service provider network 16 to provide competing and additional services to those provided by the service provider that owns and operates service provider network 16. In any event, service provider network 16 may provide access to a collection of one or more services, which the customers may purchase (typically on a monthly basis for a monthly fee).

In the example of FIG. 1, service provider network 16 includes aggregation device 32. Aggregation device 32 represents one or more network devices (e.g., a router, a switch, etc.) that route network data (e.g. in the form of packets) between service provider network 16, public network 14, back office network 20, and customer networks 18. Each of customer networks 18 represents a network owned and operated by customers of service provider network 16. Typically, a customer's premises (e.g., a customer's home) provides the infrastructure (such as the physical communication medium) to support each of customer networks 18.

The service provider typically installs and maintains physical communication mediums, which are shown as links 22A-22N ("links 22"), to each of customer networks 18. In the example of FIG. 1, links 22 are each assumed to represent a fiber link for purposes of illustration. The techniques however should not be limited to fiber links but may include any other type of link, including a coaxial link, a copper link or any other form of physical communication medium capable of delivering data. The techniques may be extended to wireless communication mediums that do not involve physical communication mediums.

Each of customer networks 18 includes a respective one of demarcation point device (DPD) 24A-24N ("DPDs 24") and a respective one of customer premises equipment (CPE) 26A-26N ("CPE 26"). Each of DPDs 24 represents a device that transfers data between a first physical communication medium used within service provider network 16 to communicate the data, e.g., links 22 shown in the example of FIG. 1, and a second physical communication medium used within customer networks 18 to communicate the data. In the context of transferring data between fiber links 22 and customer network physical communication mediums, DPDs 24 may each represent an optical network unit (ONU) (which may also be commonly referred to as an "optical node terminal" or "ONT"). Other examples of DPDs 24 include an asymmetrical digital subscriber line (ASDL) modem, a very-high-data-rate digital subscriber line (VSDL) modem, a cable modem, a satellite modem, a mobile broadband modem, and the like. This second physical communication medium used within customer network 18A may comprise coaxial cable, copper telephone lines, Ethernet cable, or any other type of physical communication medium commonly employed in customer premises to facilitate the communication of data, such as voice data, Internet data, or video data.

DPDs 24 may interface with one or more physical communications mediums within customer networks 18 and effectively de-multiplex two or more services delivered over the common physical communication medium of service provider network 16. For example, customer network 18A may include a coaxial communication medium for delivery of data and television services and a copper communication medium for delivery of voice or telephone services. DPD 24A may receive data, television, and telephone services via link 22A and de-multiplex the data and television services from the telephone services, delivering the data and television services via the coaxial communication medium and the telephone services via the copper communication medium.

In any event, CPE 26 may each represent a device employed by the customer that utilizes one or more of the services provided by service provider network 16 to which the customer subscribes. Examples of CPE 26 include Internet-ready televisions, non-Internet-ready televisions, set-top boxes (STBs), gaming consoles, personal media players, digital video disc (DVD) players, Blu-ray players, desktop computers, laptop computers, slate or tablet computers, traditional telephones, Voice over Internet Protocol (VoIP) telephones, mobile phones, global positioning system (GPS) devices, wireless access points (WAPs), switches, hubs, printers, servers, and any other similar devices commonly employed by customers to access one or more of the services provided by service provider network 16. Although shown as including a single one of DPDs 24 and CPE 26, each of customer networks 18 may include more than one of DPDs 24 and/or more than one of CPE 26. The techniques should not therefore be limited in this respect to the example shown in FIG. 1.

Aggregation device 32 represents a network device that aggregates or groups traffic from DPDs 24 for delivery upstream to public network 14 and that distributes traffic from public network 14 downstream to DPDs 24. Generally, the term "upstream traffic" refers to traffic transmitted from customer networks 18 to public network 14. The term "downstream traffic" refers to traffic transmitted from public network 14 to customer networks 18. For ease of illustration, FIG. 1 shows only a single switch included as part of service provider network 16. Service provider network 16 may in fact include multiple switches that each aggregate upstream and downstream traffic for multiple DPDs 24. The techniques should therefore not be limited in these respects to the example shown in FIG. 1.

Network technology constantly evolves and service providers may deploy this new technology to enable delivery of new types of network services to customers. Competition is often fierce amongst service providers to retain and attract customers. To differentiate from the competition, service providers may not only offer new services to customers, but offer a level of quality with each service to attract customers with different service requirements. For example, customers may expect to receive three concurrent services (e.g., high speed Internet access, VoIP service, and IPTV service) using a single connection to service provider network 16 and only minimal equipment. The service provider may carefully design service provider network 16 to ensure concurrent delivery of all three services without sacrificing network speed, reliability, or audio/video quality. Careful design of the service provider network may help to ensure a high quality of experience (QoE) for delivery of each service.

Customer networks are also becoming more complex in terms of their network configuration and ability to process increasingly more amounts of data. Network technology vendors design new types of CPE to utilize new network services and also develop new uses for existing network services. Vendors may not consider how a new CPE design may impact QoE of a particular network service. Through no fault of the service provider, the new CPE design may degrade QoE for a network service delivered by service provider network 16 when connected to the customer network. Furthermore, vendors may design CPE to "plug and play" (PnP) with preexisting network infrastructure. That is, vendors may preconfigure PnP CPE or may design self-configuring PnP CPE to enable an average customer to connect PnP CPE to the customer network with minimal (if any) equipment installation or equipment setup. Average customers may, using these new types of PnP CPE, quickly expand the customer network by adding CPE without considering first whether the added CPE is compatible with the existing network infrastructure (of both the service provider network and the customer network) or whether the added CPE will impact the QoE of a network service.

Customers may expect to concurrently connect a number of CPE to service provider network 16 without experiencing degradation in the QoE of a particular service. Customers may appreciate the benefits of PnP CPE and may push the limits of the service provider network through expansion of the customer network. Average customers may not understand that expansion of the customer network introduces complexities to the service provider network and customer network. The service provider can take precautions to ensure that the design of the service provider network can deliver a high QoE to a majority of customers. However, the service provider cannot control and easily manage service provider network 16 to accommodate all the complexities of customer networks. If customers experience degradation in QoE for a service, service providers may attempt to quickly and cheaply rule out the service provider network as a source for the degradation to avoid losing a customer to a competitor.

While customers may not continuously monitor QoE for a service, when services appear degraded, customers commonly assume that the degradation in the services occurs as a result of issues within the service provider network. Customers then contact the service provider requesting that these issues be resolved so that that delivery of services can be restored. The average support technician answering such customer requests on behalf of the service provider may not have the training or experience to quickly resolve a particular network issue. Even if the network issue can be uncovered by a support technician, explaining the issue to a customer can be difficult because the average customer does not understand the complexities of networks or industry terminology. To ensure average customers feel the service provider is addressing an issue, a support technician diagnoses and speaks about the issue in layman terms. For example in resolving and explaining an issue with a cable Internet access service, the average customer may not understand when a support technician refers to a cable modem in "standby mode" or "receiving network traffic." The average customer may however understand the support technician when inquiring or explaining how a light emitting diode (LED) on the cable modem should blink or change color. Communicating about an issue in a language that a customer can easily understand can make all the difference in retaining or losing that customer.

Service providers generally deal with the increasing complexity of customer networks, isolate issues in service delivery, and explain issues with a non-technical customer in mind. Service providers are typically unable to remotely monitor and test QoE regarding delivery of a service solely within a customer network or remotely isolate an issue to either the service provider network or the customer network. Typically, service providers are required to send a technician (often referred to as a "roll a truck") to a customer's location to diagnose QoE issues with services that arise beyond the service provider network. Failing to timely isolate issues can be costly and severely degrade the customer's perception regarding the ability of the service provider to efficiently and quickly resolve network issues.

In accordance with the techniques described in this disclosure, DPD 24A may be configured to monitor and test QoE for delivery of a service through customer network 18A to facilitate troubleshooting of issues with delivery of services provided by service provider network 16. The techniques may enable DPD 24A to operate as a test server to test the delivery of services through customer network 18A. In addition, the techniques may enable DPD 24A to operate as a test client to quality of experience test server 30 located in back office 20 of service provider network 16 or, more commonly, located in public network 14 (e.g., the Internet). The techniques may therefore enable remote delivery of service testing of customer network 18A without introducing variables associated with service provider network 16 and public network 14. To facilitate troubleshooting of issues with the delivery of service, the techniques may further enable DPD 24A to provide QoE information to back office 20 of service provider network 16 in regards to delivery of a service through customer network 18A or a portion of service provider network 16 (e.g., link 22A) leading up to customer network 18A. The techniques may enable DPD 24A to provide QoE information in industry standard network statistic format or in a consumer metric format easily understood by an average technician and/or customer.

Customer network 18A may have many users (e.g., customers) simultaneously accessing services from service provider network 16. So as not to interfere with a service or degrade QoE of a service, these users may coordinate with the service provider and consent to the service provider initiating testing customer network 18A during non-business hours when the user is likely offline. In the case where customer network 18A represents a home network, the user may consent to testing of customer network 18A while the user is away from the home (for instance, while at work), or offline (for instance, while sleeping). This coordination may ensure multiple users can utilize customer network 18A without experiencing a degradation of QoE for a service.

DPD 24A may test QoE for delivery of a service provided by service provider network 16, through customer network 18A. DPD 24A may transmit one or more customer query data packets via customer network 18A to test at least one service within customer network 18A. For example, DPD 24A may perform a latency test of customer network 18A as part of a larger QoE test for a particular service. As a first step in the latency test, DPD 24A may transmit a customer query data packet via customer network 18A to CPE 26A. DPD 24A may determine a sent time associated with the transmission of the customer query data packet for use by DPD 24A in performing later steps of the latency test. The customer query data packet may contain both a header and data. The header may contain information defined by a protocol (e.g., IP) for communicating on a network. CPE 26A may receive the data packet and determine (based on the header and the data within the data packet) that the customer query data packet represents a "ping" or "echo" request from DPD 24A (e.g., CPE 26A may determine DPD 24A transmitted the customer query data packet to request a reply data packet from CPE 26A that contains data which mirrors the data contained within the customer query data packet).

In response to transmitting the one or more customer query data packets, DPD 24A may receive one or more customer reply data packets from customer network 18A. For example, as a second step in the latency test, DPD 24A may receive a customer reply data packet via customer network 18A from CPE 26A. The customer reply data packet may contain data which mirrors the data contained within the customer query data packet transmitted by DPD 24A. DPD 24A may determine the customer reply data packet represents a response from CPE 26A to the ping request sent by DPD 24A. DPD 24A may then determine a receipt time associated with the receipt of the customer reply data packet for use by DPD 24A in performing later steps of the latency test.

DPD 24A may determine one or more customer network statistics based on one or more of the customer query data packets and the customer reply data packets. For example, as a last step in the latency test of customer network 18A, DPD 24A may determine an elapsed time that represents the amount of time that elapsed from the moment when DPD 24A transmitted the customer query data packet to the moment when DPD 24A received the customer reply data packet. DPD 24A may determine the time by determining the difference between the receipt time and the sent time determined in prior steps of the latency test. The elapsed time may represent a "two-way" latency measurement of customer network 18A, that is the time to transmit and receive a data packet via customer network 18A between DPD 24A and CPE 26A. Determining the QoE for delivery of a service provided by service provider network 16, through customer network 18A may depend on the latency measurement. For example, for a high level of QoE for delivery of a particular service, may require the latency measurement of customer network 18A to exceed a minimum threshold. If the latency measurement of customer network 18A does not exceed the minimum threshold, the QoE for delivery of a particular service may be degraded.

After determining the customer network statistics, DPD 24A may transmit the statistics to back office network 20 where an operator and/or support technician may access the statistics to aid the operator and/or support technician in trouble shooting or monitoring degradation of QoE for delivery of a service. In the example of FIG. 1, back office network 20 includes a quality of experience (QoE) test server 30. While FIG. 1 illustrates back office network 20 as including only a quality of experience (QoE) test server 30, back office network 20 may also include other equipment for managing service provider network 16 (e.g., a dynamic host configuration protocol (DHCP) server and/or a remote access dial in user service (RADIUS) server).

In the example of FIG. 1, QoE test server 30 communicates with DPD 24A to initiate a QoE test or receive customer network statistics based on a QoE test performed by DPD 24A. For example, QoE test server 30 may transmit data in the form of an initiate QoE test command via service provider network 16 to DPD 24A. Responsive to the initiate QoE test command, DPD 24A may perform a QoE test of a service running on customer network 18A. DPD 24A may perform a QoE test (including the latency test described above) and transmit customer network statistics based on the test to QoE test server 30. QoE test server 30 may receive the customer network statistics from DPD 24A and store the customer network statistics or display the statistics on a QoE monitoring website hosted by QoE test server 30. An operator or support technician may access the customer network statistics (e.g. from the QoE monitoring website) to diagnose or monitor degradation of QoE for delivery of a service.

DPD 24A may further act as a test client for QoE tests performed by QoE test server 30. Similar to the way in which DPD 24A and CPE 26A communicate to perform a QoE test of customer network 18A, QoE test server 30 and DPD 24A may communicate to perform a QoE test of service provider network 16. For example, QoE test server 30 may initiate a QoE test and as part of the test, transmit provider query data packets (similar to the customer query data packets above) to DPD 24A. DPD 24A may receive the provider query data packets and transmit provider reply data packets to QoE test server 30. QoE test server 30 may generate provider network statistics, like the customer network statistics generated by DPD 24A, based on the provider query and provider reply data packets transmitted as part of the QoE test.

In this way, as described in more detail below, DPD 24A may perform QoE tests (including the latency test described above, and other similar tests) of customer network 18A to obtain a series of network statistics and assist QoE test server 30 in generating similar network statistics. These QoE tests performed by DPD 24A provide a controlled environment to monitor QoE for delivery of a service over customer network 18A without introducing variables from service provider network 16 that may impact the monitored QoE. DPD 24A may allow a service provider (or customer) to obtain accurate QoE network statistics on a per service basis. Such statistics and monitoring may aid the service provider (or customer) in diagnosing and troubleshooting issues experienced at customer network 18A relating to a service degradation (e.g. on a monitoring website hosted by QoE test server 30 in back office network 20). The techniques, as described in more detail below, may further enable DPD 24A to display these QoE network statistics in a customer-understandable form (e.g., consumer level metrics), such as by reporting an average time to download a music file (e.g., a motion picture experts group (MPEG) 1 or 2 Audio Layer 3 (MP3) file) in addition to (or in lieu of) reporting a bit rate. By reporting these statistics in this manner, customers may more readily understand a cause and/or impact of the service degradation (refer to FIG. 4 and the description of FIG. 4 below).

QoE test server 30 may initiate and receive QoE network statistics from multiple customer networks 18. As such, the monitoring website hosted by QoE test server 30 in back office network 20 may present QoE network statistics in a way that generates a "traffic" congestion report. For example, the monitoring website may present a geographical map identifying locations of back office network 20, each of customer networks 18, and links 22. The monitoring website may overlay network statistics at each of customer networks 18 and color code each of links 22. The monitoring website may appear similar to a street traffic congestion map viewed on the Internet or on a television news broadcast, only rather than indicate street traffic congestion, the monitoring website may indicate network traffic congestion and QoE problem areas. For example, if the QoE network statistics for one of customer networks 18 indicate a high QoE of a service (e.g., a value of five for MOS of a VoIP service) the one of links 22 between the one of customer networks 18 and back office 20 may appear green. Conversely, links 22 may appear red if the network statistics for one of customer networks 18 indicate a low QoE (e.g., a value of 1 for MOS of a VoIP service). In this way, a support technician may quickly identify and isolate a QoE issue for a particular geographical region that includes multiple customer networks 18 and multiple links 22.

In other examples, the monitoring website may present enhanced network statistics overlaid at each of customer networks 18 to show more detail on the traffic congestion report. The monitoring website may color code specific network connections on links 22 that exist between customer networks 18 and commonly accessed application servers that may reside outside service provider network 16 (e.g., within public network 14) that broadband customers may regularly utilize (e.g., a server that hosts an online auction website, a social media website, a search engine, etc.). For example, the traffic congestion report of the monitoring website may subdivide each of links 22 within the geographical map and subdivide the associated color code described above to high-light network statistics and QoE of service of individual network connections that utilize links 22. In other words, rather than illustrate one of links 22 as a single line segment with a single color representing overall network statistics or QoE of service on one of links 22, the traffic congestion report of the monitoring website may illustrate one of links 22 as multiple parallel line segments with a color (e.g., green, yellow, red, etc.) to indicate QoE of service or network statistics for a connection between one of customer networks 18 and an external server located within public network 14.

Figure 2A:
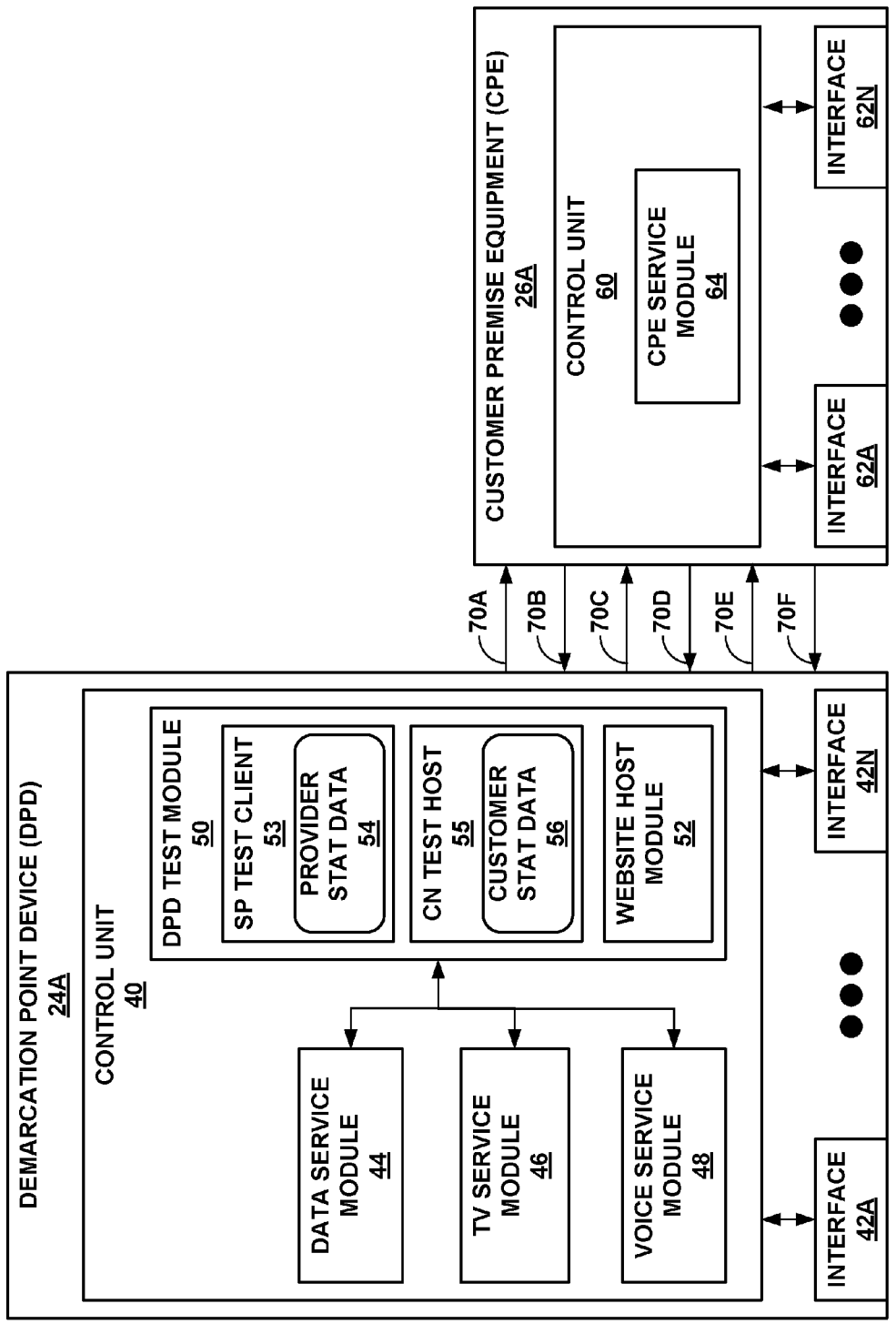
FIGS. 2A-2B are block diagrams illustrating in more detail the network system shown in the example of FIG. 1.
Figure 2B:
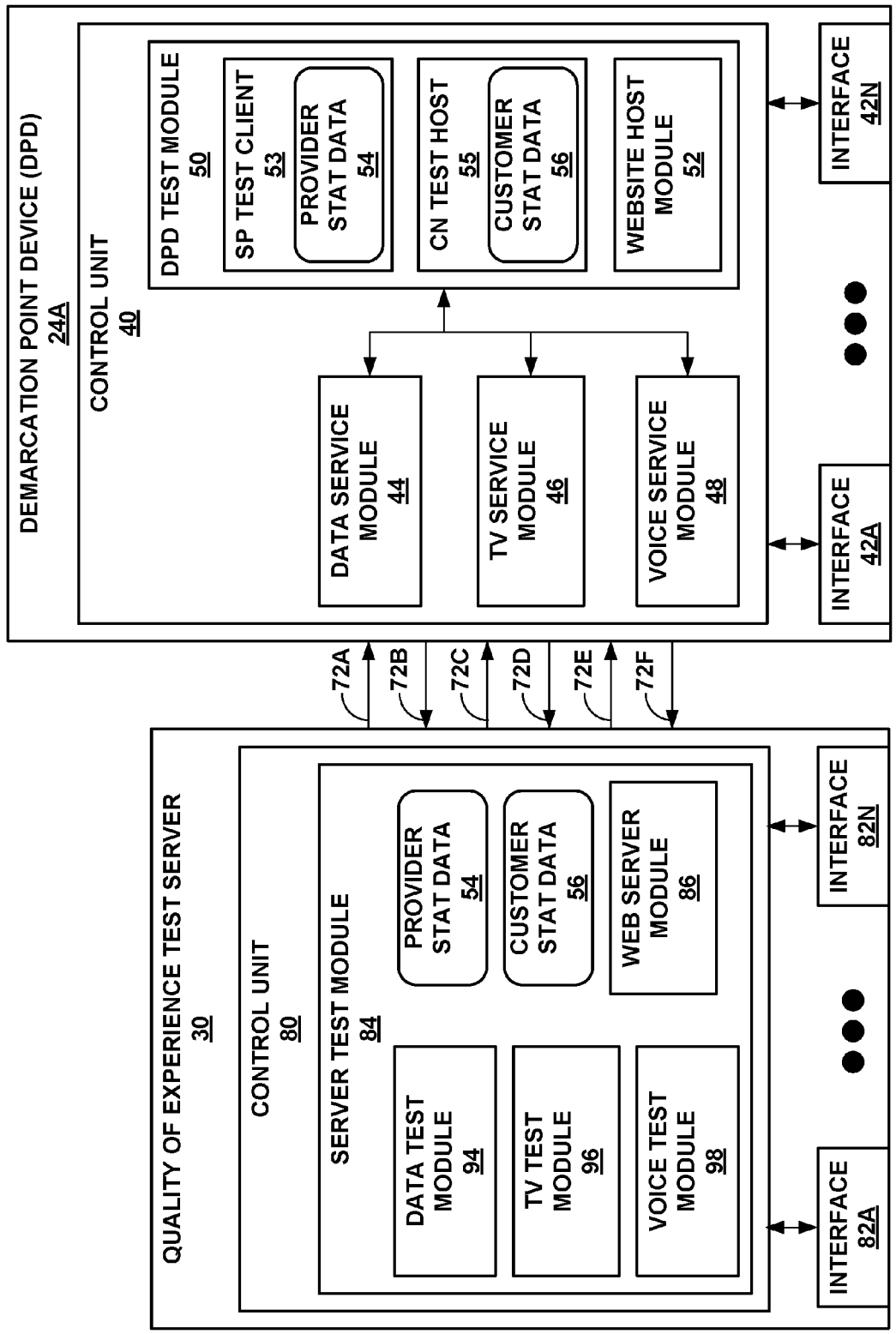

FIGS. 2A-2B are block diagrams illustrating in more detail network system 10 shown in the example of FIG. 1. FIG. 2A is a block diagram illustrating DPD 24A and CPE 26A of network system 10 of FIG. 1 in more detail. In the example of FIG. 2A, DPD 24A includes a control unit 40 and interfaces 42A-42N ("interfaces 42"). Control unit 40 includes a data service module 44, a TV service module 46, a voice service module 48, and a DPD test module 50. Control unit 40 may represent one or more processors (not shown in FIG. 2A) that execute software instructions, such as those used to define a software or computer program, stored to a computer-readable storage medium (again, not shown in FIG. 2A), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 40 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each of interfaces 42 represents an interface for interfacing with a physical communication medium, such as fiber link 22A and any customer premises physical mediums, such as coaxial cable, copper line, CAT5 cable, power line, etc. An interface card (IFC) may comprise one or more of interfaces 42, which in this context may be referred to as ports.

Generally, control unit 40 of DPD 24A may receive multiple services from service provider network 16 over a single communication medium (e.g., link 22A) via a single interface (e.g. interface 42A). These services may, in other words, be multiplexed with one another to form a single stream of data for delivery over link 22A to DPD 34A. DPD 24A may then de-multiplex these two or more services from each other to deliver each service via two or more of interfaces 42 to two or more of CPE 26. For example, control unit 40 may receive a network signal from service provider network 16 via interface 42A and de-multiplex this network signal to recover a data service, a VoIP service, and a cable television service. DPD 24A may deliver the data and VoIP services to CPE 26A (e.g., a computer) via interface 42B and deliver the cable television service to CPE 26B (not shown in FIG. 2) (e.g., a cable television set-top box) via interface 42C.

More specifically, control unit 40 may include a data service module 44 that represents a module that may manage the delivery of data services provided by service provider network 16 downstream to CPE 26A. Data service module 44 of control unit 40 may terminate the data service within the network signal from service provider network 16 according to a version of internet protocol (IP), such as IP version 4 (IPv4) as defined by the Internet Engineering Task Force (IETF) in a Request for Comments (RFC) 791 entitled, "Internet Protocol DARPA Internet Program Protocol Specification," which is hereby incorporated by reference as if set forth in its entirety herein. Data service module 44 of control unit 40 may also manage file transfers between DPD 24A and CPE 26A using a file transfer protocol (FTP), as defined by the IETF in a RFC 959 entitled, "File Transfer Protocol (FTP)," which is hereby incorporated by reference as if set forth in its entirety herein. Data service module 44 of DPD 24A may initiate and commence operations for performing an IPv4 session (or similarly an FTP session) between DPD 24A and CPE 26A by transmitting data packets based on IPv4 to CPE 26A via interface 42B.

Control unit 40 further includes a TV service module 46, which represents a module that may manage the delivery of television services (e.g., IPTV service) provided by service provider network 16 downstream to CPE 26A. TV service module 46 of control unit 40 may terminate the IPTV service within the network signal from service provider network 16 according to an Internet Group Management Protocol (IGMP) as defined by the IETF RFC 2236 or a Real Time Streaming Protocol (RTSP) as defined by the IETF RFC 2326 which are both hereby incorporated by reference as if set forth in their entirety herein. TV service module 46 of DPD 24A may initiate and commence operations for performing an IPTV session between DPD 24A and CPE 26A by transmitting data packets based on RTSP to CPE 26A via interface 42C.

Additionally, control unit 40 includes a voice service module 48, which represents a module that may manage the delivery of voice services (e.g., VoIP service) provided by service provider network 16 downstream to CPE 26A. Voice service module 48 of control unit 40 may terminate the VoIP service within the network signal from service provider network 16 based on a Real Time Transport Protocol (RTP) as defined by the IETF in RFC 3550 entitled, "RTP: A Transport Protocol for Real-Time Applications," which is hereby incorporated by reference as if set forth in its entirety herein. Voice service module 48 of control unit 40 may likewise utilize any other protocol known in the art for initiating and terminating VoIP sessions. For instance, voice service module 48 may terminate the VoIP service within the network signal from service provider network 16 based on a Session Initiation Protocol (SIP) as defined by the IETF in RFC 3261 entitled, "SIP: Session Initiation Protocol," which is hereby incorporated by reference as if set forth in its entirety herein. Voice service module 48 of DPD 24A may initiate and commence operations for performing a VoIP session between DPD 24A and CPE 26A by transmitting a data packets based on RTP to CPE 26A via interface 42D.

Control unit 40 also includes a DPD test module 50. DPD test module 50 may represent a module that implements the techniques described in this disclosure to test QoE for delivery of a service. In the example of FIG. 2A, DPD test module 50 includes service provider (SP) test client module 53 for acting as a test client to QoE test server 30 when testing QoE of a service provided through service provider network 16. DPD test module 50 also includes customer network (CN) test server module 55 for acting as a test server when testing QoE of a service through customer network 18A. CN test host module 55 interacts with CPE 26A to perform QoE tests of customer network 18A. SP test client module 53 may likewise interact with QoE test server 30 when QoE test server 30 performs a QoE test of service provider network 16. DPD test module 50 may include an interrupt timer (not shown for purposes of convenience) that periodically interrupts DPD 24A to automatically perform a QoE test of a network service provided to CPE 26A. DPD test module 50 may also perform a QoE test upon receiving an initiate test command from either service provider network 16 or customer network 18A via one or more of interfaces 42.

In the example of FIG. 2A, DPD test module 50 also includes website host module 52. DPD test module 50 may invoke website host module 52 to present a DPD webpage user interface to a customer or administrator. The DPD webpage user interface may include a configuration page for modifying parameters of DPD 24A to communicate on service provider network 16 and customer network 18A. From the configuration page, an administrator or operator may also update control unit 40 and associated data service module 44, tv service module 46, and voice service module 48 as a "typical" profile for services managed by DPD 24A changes or as new services using different protocols come into play.

The DPD webpage user interface may include a QoE test page that includes options for initiating a QoE test of a specific network service via customer network 18A and/or service provider network 16. For example, an administrator and/or customer may interact with the QoE test page of the DPD webpage user interface to send an initiate test command to DPD 24A via service provider network 16 or customer network 18A. Test module 50 of DPD 24A may receive the initiate test command from interface 42A cause DPD 24A to perform a VoIP service QoE test of a VoIP service on customer network 18A.

In addition to providing a way by which a customer or administrator may initiate one or more QoE tests, the QoE test page of DPD webpage user interface may include results of QoE tests. Website host module 52 may display within the QoE test page, the results of QoE tests as provider network statistics, customer network statistics, or more easily understood consumer level metrics. Customer and provider network statistics may indicate the quality of a network or the QoE of a network service. Customer network statistics and provider network statistics may include data packet loss percentage, data packet latency, data packet jitter, download speed, upload speed, streaming audio bit rate, streaming video bit rate, upstream bandwidth utilization, and downstream bandwidth utilization. Such statistics may also include bandwidth consumption. Such statistics and monitoring can be useful for an administrator or support technician to diagnose and troubleshoot network service degradation issues.

However an average customer may not understand the meaning behind such customer and provider network statistics. Website host module 52 may also display on the QoE test page consumer level metrics, generated based on the network statistics (e.g., provider statistics and/or customer statistics) to answer questions typically asked by the average customer. For example, consumer level metrics may provide information such as: a time to download a high definition (HD) movie, a speed of a file download or a file upload, whether customer network 18A can stream a HD movie, a time to start viewing a HD movie after initiating a request to stream the HD movie, a time to upload or download a webpage, a difference in quality levels as between two applications running on customer network 18A, and a quality level of game play for a particular game running on customer network 18A.

As further shown in the example of FIG. 2A, CPE 26A includes a control unit 60 and interfaces 62A-62N. Control unit 60 may, similar to control unit 40 of DPD 24A, represent one or more processors (not shown in FIG. 2A) that execute software instructions, such as those used to define a software or computer program, stored to a computer-readable storage medium (again, not shown in FIG. 2A), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 60 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each of interfaces 62 represents an interface for interfacing with a physical communication medium, such as fiber link 22A and any customer premises physical mediums, such as coaxial cable, copper line, CAT5 cable, etc. An interface card (IFC) may comprise one or more of interfaces 62, which in this context may be referred to as ports.

Control unit 60 of CPE 26A includes CPE service module 64. CPE service module 64 represents a module that manages network service communication between CPE 26A and external devices (e.g., DPD 24A). CPE service module 64 may transmit and receive data via interfaces 62 to DPD 24A relating to a network service from service provider network 16. For example, CPE 26A may represent an IPTV set-top box and CPE service module 64 may manage an IPTV service received via service provider network 16. CPE service module 64 may likewise manage a voice service, a data service, or any other type of network service received by other types of CPE.

As explained above, DPD test module 50 may receive an initiate test command either internally from an interrupt timer within DPD test module 50 or externally from one of network interfaces 42 or the DPD webpage user interface. DPD test module 50 may receive the initiate test command after a user of customer network 18A coordinates with an operator of service provider network 18A an appropriate time to commence a network test. For instance, the user may consent to the service provider testing customer network 18A during non-business hours when the user is likely offline. Or in the case where customer network 18A represents a home network, the user may consent to testing of customer network 18A while the user is away from the home, for instance at work, or offline when the user is sleeping. Because multiple users may utilize customer network 18A, coordination between the operator and the multiple users may ensure a test of customer network 18A does not interfere with or degrade a quality of experience for a service.

The initiate test command received by DPD 24A may include a service identifier that DPD test module 50 may use to determine a service type (e.g, VoIP, IPTV, data, etc.) and a service location (e.g., customer network 18A, service provider network 16, etc.). Upon receiving the initiate test command and regardless of the source, CN test host module 55 of DPD test module 50 may conduct a QoE test for delivery of a service based on the service type and service location included in the initiate test command.

Each QoE test conducted by CN test host module 55 of DPD test module 50 may include a series of steps that DPD test module 50 may perform to obtain a set of network statistics (e.g., provider network statistics or customer network statistics). The set of network statistics obtained and likewise the steps performed by DPD test module 50 may vary depending on the service tested. For example, QoE of a VoIP service may depend on network jitter and network latency and QoE of a data service may depend on network latency but not on network jitter. A VoIP service QoE test may include steps for testing both network latency and network jitter, while a data service QoE test may include steps for testing network latency but not steps for testing network jitter.

DPD test module 50 of DPD 24A may receive an initiate test command. DPD test module 50 may determine the initiate test command indicates voice (e.g., VoIP) as the service type and customer network 18A as the service location. In response to receiving the initiate test command, CN test host module 55 of DPD test module 50 may initiate a VoIP service QoE test of customer network 18A. The VoIP service QoE test may include a series of steps for measuring network statistics such as data packet loss percentage, data packet latency and data packet jitter.

Data packet loss occurs when a packet of data transmitted on a computer network fails to reach an intended destination. Various factors, beyond the scope of this description, may cause data packet loss, however some network services, such as VoIP, require a very low data packet loss percentage for a high QoE. For instance, a VoIP service on a network with a high data packet loss percentage may contain frequent and intermittent pauses in voices of users. In performing the steps of the VoIP service QoE test of customer network 18A to measure data packet loss percentage, CN test host module 55 of DPD test module 50 may cause voice service module 48 to initiate a VoIP session with CPE 26A (e.g., a VoIP telephone). CN test host module 55 of DPD test module 50 may cause voice service module 48 to transmit a customer query data packet via interface 42A to CPE 26A (e.g., message 70A).

The customer query data packet may include a header and data corresponding to a "ping" or "echo" request. CPE service module 64 of CPE 26A may acknowledge the VoIP session and may receive message 70A from customer network 18A via interface 62A. In response, CPE 26A may transmit a customer reply data packet (e.g., message 70B) via interface 62A that includes a header and data indicating a "reply to ping." Voice service module 48 may receive the customer reply data packet from CPE 26A via interface 42A determine the customer reply data packet indicates that CPE 26A successfully received the customer query data packet (e.g., message 70A) and voice service module 48 may cause CN test host module 55 of DPD test module 50 to store the customer query and customer reply data packets as a data packet pair. CN test host module 55 of DPD test module 50 may store the data packet pair as customer stat data 56. CN test host module 55 of DPD test module 50 may repeat the above process by causing voice service module 48 to transmit a series of customer query data packets and receive a series of customer reply data packets.

CN test host module 55 of DPD test module 50 may compare the series of customer query data packets and the series of customer reply data packets stored as customer stat data 56. DPD test module 50 may treat each customer query data packet that does not correspond to a customer reply data packet as a lost data packet. CN test host module 55 of DPD test module 50 may determine the percentage of lost data packets out of the total customer query data packets transmitted represents the data packet loss percentage of customer network 18A and store the data packet loss percentage as customer stat data 56.

Data packet latency can be expressed as an amount of time for a data packet to arrive at an intended destination. Some network services, such as VoIP require low data packet latency to maintain a high QoE. For instance, a VoIP service on a network with a high data latency may contain voice delay or voice echo. To determine data packet latency as part of the VoIP service QoE test initiated above, CN test host module 55 of DPD test module 50 may determine a transmit time associated with when voice service module 48 transmitted each customer query data packet to CPE 26A. CN test host module 55 of DPD test module 50 may also determine a receipt time associated with when voice service module 48 received each customer reply data packet from CPE 26A. CN test host module 55 of DPD test module 50 may determine a two-way data packet latency for each data packet pair (e.g., each customer query data packet and corresponding customer reply data packet) based on these two times. That is, CN test host module 55 of DPD test module 50 may determine the two-way data packet latency for a customer query and customer reply data packet pair is the elapsed time from when voice service module 48 transmitted the customer query data packet to when voice service module 48 received the corresponding customer reply data packet. For example, CN test host module 55 of DPD test module 50 may determine a customer reply data packet received from CPE 26A arrived at interface 42A one hundred fifty milliseconds after voice service module 48 transmitted a corresponding customer query data packet via the same interface 42A. This time of one hundred fifty milliseconds may represent the two-way data packet latency of customer network 18A and half of one hundred fifty milliseconds, e.g. seventy-five milliseconds, may represent the "one-way" data packet latency. CN test host module 55 of DPD test module 50 may average each one-way latency time for each customer query and customer reply data packet pair to arrive at a data packet latency measurement for customer network 18A. CN test host module 55 of DPD test module 50 may store each one-way latency time as customer stat data 56.

Data packet jitter represents a variation of data packet latency from one data packet to subsequent data packets. A large data packet jitter measurement may impact a service, such as VoIP, that requires constant data packet latency (or zero jitter). Many VoIP service devices (e.g. VoIP phones) contain data buffers to compensate for data packet jitter.

However if data packet jitter of a network is too great and beyond the capacity of the data buffer, a VoIP conversation may sound "garbled" or a series of out of order, partially spoken words. To determine data packet jitter as part of the VoIP service QoE test initiated above, CN test host module 55 of DPD test module 50 may determine a one-way data packet latency from one of the series of one-way data packet latencies determined as part of the latency test described above. CN test host module 55 of DPD test module 50 may also determine a second one-way data packet latency from a subsequent one of the series of one-way data packet latencies determined above. A difference in the first and second one-way data packet latencies may correspond to the data packet jitter of customer network 18A.

For example, the one-way data packet latency of a first customer query and customer reply data packet pair transmitted between DPD 24A and CPE 26A may be one hundred fifty milliseconds. The one-way data packet latency of a second, subsequent, customer query and customer reply data packet pair transmitted between DPD 24A and CPE 26A may be two hundred milliseconds. The time difference between the second data packet latency and the first data packet latency (e.g. negative fifty milliseconds) may represent the data packet jitter in this instance of a communication between DPD 24A and CPE 26A on customer network 18A. CN test host module 55 of DPD test module 50 may store the data packet jitter as customer stat data 56.

CN test host module 55 of DPD test module 50 may store each measured customer network statistics (e.g., latency, jitter, and packet loss percentage) as customer stat data 56 in order to quantify in part, QoE for delivery of the VoIP service received by CPE 26A from service provider network 16. For example, website host module 52 of DPD test module 50 may display these measured customer network statistics from the VoIP service QoE test performed in the above example, on the QoE test page of the DPD webpage user interface. For instance, the QoE test page may include each of latency measurements, jitter measurements, and packet loss percentage measurements as numerical values (e.g., in spreadsheet or table form).

An average customer or average support technician may, however, not understand the meaning behind these customer network statistics displayed as numerical values. Therefore, website host module 52 may also display these customer network statistics on the QoE test page as standardized consumer level metrics. For instance, the QoE test page may include a line graph that shows a quality level of the VoIP service displayed over time. The line graph may quantify the quality level as ranging in value from zero to ten (e.g., zero indicating poor quality and ten indicating high quality). Each point ranging from zero to ten for a moment of time may represent an output of a function that takes latency measurements, jitter measurements, and data packet loss percentages as inputs over time. In this way, the average customer may understand how the quality of the VoIP service varied over time in easy to interpret line graph form (e.g., consumer metric form).

The quality level of a VoIP service may further be represented as a Mean Opinion Score (MOS). MOS is generally expressed as a value ranging from one to five with a five indicating a high quality of VoIP service. Website host module 52 may calculate the MOS score for a VoIP service based on the customer network statistics. Website host module 52 may derive the MOS score of the VoIP service based on typical customer network statistic values experienced for a given MOS score. For instance, a network having a low jitter value and low latency value may typically have a high value MOS score (e.g., expressed as a value of five). A customer and/or average support technician may better understand QoE for a service by viewing customer network statistics as standardized consumer level metrics such as MOS.

DPD test module 50 may receive an initiate test command (either internally from an interrupt timer within DPD test module 50 or externally from one of network interfaces 42) to initiate a television (e.g., IPTV) service QoE test for delivery of an IPTV service on customer network 18A. Similar to the VoIP service QoE test described above, each IPTV service QoE test conducted by DPD test module 50 may include a series of steps that DPD test module 50 may perform to obtain a set of network statistics. In general, QoE for an IPTV service and QoE for a VoIP service may depend on identical network characteristics (e.g., data packet latency, data packet jitter, and data packet loss percentage). Therefore, DPD test module 50 may perform similar steps during an IPTV service QoE test as the VoIP service QoE test described above.

In brief, upon receiving the initiate test command to test the IPTV service on customer network 18A, module 50 may initiate an IPTV service QoE test of customer network 18A. The IPTV service QoE test may include a series of steps for measuring network statistics such as data packet loss percentage, data packet latency and data packet jitter.

To measure data packet loss percentage for IPTV on customer network 18A, DPD test module 50 of DPD 24A may cause TV service module 46 to initiate an IPTV session with CPE 26A (in this case an IPTV set-top box). CN test host module 55 of DPD test module 50 may cause TV service module 46 to transmit a customer query data packet via interface 42B to CPE 26A (e.g., message 70C). The customer query data packet may include a header and data corresponding to a "ping" or "echo" request. CPE service module 64 of CPE 26A may acknowledge the IPTV session and may receive message 70C from customer network 18A via interface 62B. In response, CPE 26A may transmit a customer reply data packet (e.g., message 70D) via interface 62B that includes a header and data indicating a "reply to ping." TV service module 46 may receive the customer reply data packet from CPE 26A via interface 42B and determine the customer reply data packet indicates that CPE 26A successfully received the customer query data packet (e.g., message 70C) and TV service module 46 may cause CN test host module 55 of DPD test module 50 to store the customer query and customer reply data packets as a data packet pair. CN test host module 55 of DPD test module 50 may store the data packet pair as customer stat data 56. CN test host module 55 of DPD test module 50 may repeat the above process by causing TV service module 46 to transmit a series of customer query data packets and receive a series of customer reply data packets.

As with the VoIP service QoE test, CN test host module 55 of DPD test module 50 may compare the series of customer query data packets with the series of customer reply data packets stored as customer stat data 56 and CN test host module 55 of DPD test module 50 may treat each customer query data packet that does not correspond to a customer reply data packet as a lost data packet. CN test host module 55 of DPD test module 50 may determine the percentage of lost data packets out of the total customer query data packets transmitted represents the data packet loss percentage for IPTV service over customer network 18A and store the data packet loss percentage as customer stat data 56.

To determine data packet latency as part of the IPTV service QoE test, CN test host module 55 of DPD test module 50 may perform similar steps as indicated in determining data packet latency for the VoIP service described above. For example, CN test host module 55 of DPD test module 50 may determine a transmit time associated with when TV service module 46 transmitted each customer query data packet to CPE 26A. CN test host module 55 of DPD test module 50 may also determine a receipt time associated with when TV module 46 received each customer reply data packet from CPE 26A. CN test host module 55 of DPD test module 50 may determine a two-way data packet latency for each data packet pair and from that determine a one-way data packet latency for each data packet pair. CN test host module 55 of DPD test module 50 may average each one-way latency time for each customer query and customer reply data packet pair to arrive at a data packet latency measurement for IPTV service over customer network 18A. CN test host module 55 of DPD test module 50 may store each one-way latency time as customer stat data 56.

To determine data packet jitter as part of the IPTV service QoE test, CN test host module 55 of DPD test module 50 may determine a variation between the one-way data packet latencies determined as part of the latency test steps performed above, similar to determining data packet jitter as part of the VoIP service QoE test. For example, CN test host module 55 of DPD test module 50 may determine a difference between a first and a second measured one-way data packet latency and the difference may correspond to the data packet jitter of IPTV service on customer network 18A. CN test host module 55 of DPD test module 50 may store the data packet jitter measurement for IPTV service over customer network 18A as customer stat data 56.

Website host module 52 of DPD test module 50 may display the measured network statistics from the IPTV service QoE test performed in the above example, on the QoE test page of the DPD webpage user interface. The QoE test page may include each of latency measurements, jitter measurements, and packet loss percentage measurements as numerical values in a spread sheet or table with labels.

Website host module 52 may also display these customer network statistics on the QoE test page as consumer level metrics so an average customer or average support technician can understand the meaning behind the results of the IPTV QoE test. For instance, the QoE test page may display a line graph showing a quality level of the IPTV service over time (similar to the VoIP quality graph described above). In this way, the average customer may understand how the quality of IPTV service varied over time in easy to interpret line graph form (e.g., consumer metric form). Other example metrics displayed on the QoE test page may include an indication of how quickly a user may change from one channel to the next. For example, the consumer level metrics may include a color bar indicator with green representing time to change a channel as "fast" and red representing time to change a channel as "slow". Website host module 52 may base the channel changing metrics on the IPTV service network latency measurements taken during the IPTV service QoE test.

The quality level of an IPTV service may further be expressed according to the Media Delivery Index (MDI) as defined by the Internet Engineering Task Force (IETF) in a Request for Comments (RFC) 4445 entitled, "A Proposed Media Delivery Index (MDI)," which is hereby incorporated by reference as if set forth in its entirety herein. MDI is generally expressed as two numerical values separated by a colon. This expression represents the delay factor (DF) and the media loss rate (MLR) associated with a service. DF generally corresponds to the customer network statistic of latency measured over time, in other words, variation in packet delay. MRL generally corresponds to the customer network statistic of packet loss percentage measured over time. Website host module 52 may calculate MDI for an IPTV service based on the customer network statistics generated from the tests of customer network 18A described above. A customer and/or average support technician may better understand QoE for a service by viewing customer network statistics as standardized consumer level metrics such as MDI.

DPD test module 50 may receive an initiate test command to initiate a data service (e.g., broadband internet) QoE test for delivery of a data service on customer network 18A. Similar to the VoIP and IPTV service QoE tests described above, each data service QoE test conducted by CN test host module 55 of DPD test module 50 may include a series of steps that CN test host module 55 of DPD test module 50 may perform to obtain a set of network statistics. QoE for a data service may depend on network characteristics such as data packet latency, data packet jitter, and data packet loss percentage. The data service QoE test may include steps (performed by CN test host module 55 of DPD test module 50 and data service module 44) to test these characteristics in a similar way as described above with respect to VoIP and IPTV services. However, in addition to latency, jitter, and packet loss percentage, QoE for a data service may also depend on other network characteristics such as download speed, upload speed, streaming audio/video bit rate capacity, and bandwidth utilization. For conciseness and readability, the following description describes a test of these other network characteristics while acknowledging the data service QoE test may also include steps to test jitter, latency, and packet loss.

DPD test module 50 of DPD 24A may receive an initiate test command. DPD test module 50 may determine the initiate test command indicates data as the service type and customer network 18A as the service location. In response to receiving the initiate test command, CN test host module 55 of DPD test module 50 may initiate a data service QoE test of customer network 18A.

Download speed and upload speed (also referred to as "bit rate") represent an amount of data transferable, on a network, from one device to another, in an amount of time. Download and upload are relative terms depending on whether a device is transmitting or receiving data. Upload indicates the device is transmitting data to a location (e.g., on the Internet) and download indicates the device is receiving data from the location. Typically the amount of data is represented by a single bit (b) or multiple bits (e.g., kilobit (Kb), megabit (Mb), etc.) and the amount of time is one second (s).

To determine download speed as part of the data service QoE test of customer network 18A initiated above, CN test host module 55 of DPD test module 50 may cause data service module 44 to initiate a FTP session with CPE 26A (e.g., a laptop computer). CN test host module 55 of DPD test module 50 may cause data service module 44 to transmit one or more customer query data packets via interface 42E to CPE 26A (e.g., message 70E) as part of the FTP session and CN test host module 55 of DPD test module 50 may store a start time associated with the FTP session as customer stat data 56. The start time may represent a time when data service module 44 initiated the FTP session. Message 70E may represent a large data file, for example one gigabyte of data. Depending on the speed of customer network 18A, the size of the file may affect the duration of the download speed test. Too short of a file size and the download speed test may have too short of a duration to obtain a reliable measurement. Too large of a file size and the download speed test may have too great of a duration such that the download speed test does not finish timely.

CPE service module 64 of CPE 26A may acknowledge the FTP session and may receive message 70E from customer network 18A via interface 62E. In response, CPE 26A may transmit one or more customer reply data packets (e.g., message 70F) via interface 62E that includes a header and data indicating an "end of file receipt." Data service module 44 may receive the customer reply data packets from CPE 26A via interface 42E and determine the customer reply data packet indicates that CPE 26A successfully received the customer query data packets (e.g., message 70E). Data service module 44 may cause CN test host module 55 of DPD test module 50 to store an end time associated with a time when data service module 44 received message 70F. CN test host module 55 of DPD test module 50 may determine a total transfer time based on the start time and end time stored as customer stat data 56. The transfer time may represent a time to transfer message 70E, e.g. one gigabyte of data, from DPD 24A to CPE 26A via customer network 18A. Based on the transfer time and the size of message 70E (e.g., the size of the large data file), CN test host module 55 of DPD test module 50 may determine the download speed in units of megabits per second. For example, CN test host module 55 of DPD test module 50 may determine eighty seconds elapsed during the transfer of message 70E, and determine one hundred megabits per second (e.g., one gigabyte of data equals eight thousand megabits of data and therefore eight thousand megabits divided by eighty seconds equals one hundred megabits per second) represents the download speed between DPD 24A and CPE 26A on customer network 18A. CN test host module 55 of DPD test module 50 may store the download speed as customer stat data 56.

To determine upload speed as part of the data service QoE test of customer network 18A, CN test host module 55 of DPD test module 50 may cause data service module 44 to initiate a FTP session with CPE 26A for performing the download speed test in reverse. That is, CN test host module 55 of DPD test module 50 may cause data service module 44 to transmit one or more customer query data packets via interface 42E to CPE 26A as part of the FTP session and CN test host module 55 of DPD test module 50 may store a start time associated with this FTP session as customer stat data 56.

CPE service module 64 of CPE 26A may acknowledge this FTP session and may receive message the one or more customer query packets from customer network 18A via interface 62E. In response, CPE 26A may transmit one or more customer reply data packets via interface 62E that represent the large data file received during the download speed test. Data service module 44 may receive the customer reply data packets from CPE 26A via interface 42E and determine the customer reply data packets represent the large data file and indicate that CPE 26A completed transferring the large data file. Data service module 44 may cause CN test host module 55 of DPD test module 50 to store an end time associated with this FTP session, that is, a time when data service module 44 finished receiving the large data file. CN test host module 55 of DPD test module 50 may determine a total transfer time based on the start time and end time of this FTP session and store the total transfer time as customer stat data 56. The transfer time may represent a time to transfer the large file, e.g. one gigabyte of data, from CPE 26A to DPD 24A via customer network 18A. Similar to determining the download speed above, CN test host module 55 of DPD test module 50 may use the transfer time and size of the large file to determine the upload speed between CPE 26A and DPD 24A on customer network 18A. For example, CN test host module 55 of DPD test module 50 may determine one hundred sixty seconds elapsed during the transfer of the large file, and determine fifty megabits per second (e.g., one gigabyte of data equals eight thousand megabits of data and therefore eight thousand megabits divided by one hundred sixty seconds equals fifty megabits per second) represents the upload speed between CPE 26A and DPD 24A on customer network 18A. CN test host module 55 of DPD test module 50 may store the upload speed as customer stat data 56.

Streaming audio and video quality can vary based on a bit rate between a network device transmitting the audio and video and the network device receiving the audio and video. High quality streaming audio and video may require a faster bit rate. Streaming audio/video bit rate capacity may represent the maximum bit rate supported by a network. DPD test module 50 may determine the maximum audio/video bit rate of the data service QoE test as the download speed measured between DPD 24A and CPE 26A during the above download speed test. That is, in this example, DPD test module 50 measured the download speed, and therefore the audio and video bit rate capacity, of customer network 18A as one hundred megabits per second.

Bandwidth utilization is related to network speed and bit rate. Bandwidth utilization represents network efficiency, that is, the amount of data transmitted over a network for a given period of time as compared to the maximum amount of data that the network can or is configured to transmit. For example, a transmission between DPD 24A and CPE 26A via customer network 18A may have a bit rate of ten megabits per second. Customer network 18A may support transmission of data between DPD 24A and CPE 26A at a bit rate of 100 megabits per second. Therefore the bandwidth utilization of network 18A between DPD 24A and CPE 26A is ten percent (e.g., ten divided by one hundred megabits per second). Similarly, a data service provided from service provider network 16 to customer network 18A may only provide ten megabits of download capacity to CPE 26A. Therefore, the download bandwidth utilization of the data service on network 18A may equate to one hundred percent capacity if customer network 18A experiences a download speed of ten megabits per second.

To determine bandwidth utilization as part of the data service QoE test of customer network 18A initiated above, CN test host module 55 of DPD test module 50 may cause data service module 44 to initiate several upload and download FTP sessions over time with CPE 26A (similar to the upload and download FTP sessions initiated during the speed tests described above). CN test host module 55 of DPD test module 50 may store a download and upload bit rate measured for each session. From these measured bit rates, DPD test module 50 may determine an average upload and download bandwidth utilization of the data service received by CPE 26A on customer network 18A. For example, DPD 24A and CPE 26A may perform several file transfers. CN test host module 55 of DPD test module 50 may determine an average download bit rate from these transfers as five megabits per second. CN test host module 55 of DPD test module 50 may determine an average upload bit rate from these transfers as two and one half megabits per second. CN test host module 55 of DPD test module 50 may query data service module 44 for values indicating the maximum upload and download bit rates supported by the data service from service provider network 16 (e.g., ten megabits per second download and five megabits per second upload). CN test host module 55 of DPD test module 50 may determine an average upload bandwidth utilization for the data service received by CPE 26A is fifty percent (e.g., two and one half megabits per second divided by five megabits per second) and may determine an average download bandwidth utilization for the data service received by CPE 26A is also fifty percent (e.g., five megabits per second divided by ten megabits per second). CN test host module 55 of DPD test module 50 may store the average bandwidth utilizations as customer stat data 56.

CN test host module 55 of DPD test module 50 may store each measured customer network statistics (e.g., download speed, upload speed, streaming audio/video bit rate capacity, and bandwidth utilization) as customer stat data 56 in order to quantify in part, QoE for delivery of the data service received by CPE 26A from service provider network 16. For example, website host module 52 of CN test host module 55 of DPD test module 50 may display these measured customer network statistics from the data service QoE test performed in the above example, on the QoE test page of the DPD webpage user interface. For instance, the QoE test page may include each of latency measurements, jitter measurements, and packet loss percentage measurements, download speed, upload speed, streaming audio/video bit rate capacity, and bandwidth utilization as numerical values.

An average customer or average support technician may, however, not understand the meaning behind these customer network statistics displayed as numerical values. Therefore, website host module 52 may also display these customer network statistics on the QoE test page as consumer level metrics. For instance, the QoE test page may include a line graph that shows a quality level of the data service displayed over time (similar to the VoIP and IPTV quality metrics described above). The line graph may quantify the quality level as ranging in value from zero to ten (e.g., zero indicating poor quality and ten indicating high quality). Each point ranging from zero to ten for a moment of time may represent an output of a function that the customer network statistics as inputs over time. In this way, the average customer may understand how the quality of the data service varied over time in easy to interpret line graph form (e.g., consumer metric form).

Rather than display tables or graphs, that an average customer may or may not understand, the QoE test page may also include, as consumer level metrics, answers to common consumer questions. CN test host module 55 of DPD test module 50 may base the answers displayed by website host module 52 on the QoE test page on the data recorded from the data service QoE test. For example, consumer level metrics included on the QoE test page may provide information such as: a time to download a high definition (HD) movie, a speed of a file download or a file upload, whether customer network 18A can stream a HD movie, a time to start viewing a HD movie after initiating a request to stream the HD movie, a time to upload or download a webpage, a difference in quality levels as between two applications running on customer network 18A, and a quality level of game play for a particular game running on customer network 18A. For example, CN test host module 55 of DPD test module 50 may determine the time displayed by website host module 52 to download a HD movie based on the download speed measured during the data service QoE test. DPD test module 50 may determine a size of the HD movie. By dividing the size of the HD movie with the download speed stored as customer stat data, CN test host module 55 of DPD test module 50 can provide a time in seconds to download the HD movie. DPD test module 50 can utilize customer stat data 56 to similarly generate consumer metrics so the average customer can understand results of a data service QoE test.

Website host module 52 may present customer network statistics and/or consumer level metrics as a single QoE measurement for each service received at customer network 18A. Likewise, website host module 52 may present these statistics and metrics as multiple QoE measurements organized according to each CPE involved in the test. For example, the bandwidth utilization of CPE 26A may differ from the bandwidth utilization of CPE different from CPE 26A yet both may be part of customer network 18A. In this way, a customer and/or support technician may understand QoE of a particular service experienced by CPE 26A and not simply QoE of a particular service experienced by all CPE on customer network 18A.

FIG. 2B is block diagrams illustrating DPD 24A and QoE test server 30 of network system 10 of FIG. 1 in more detail. DPD 24A of FIG. 2B is likewise described with respect to DPD 24A of FIG. 2A. For instance, in the example of FIG. 2B, DPD 24A includes control unit 40, interfaces 42, data service module 44, TV service module 46, voice service module 48, and DPD test module 50. DPD test module 50 may include website host module 52, SP test client module 53, CN test host module 55, provider stat data 54, and customer stat data 56.

As further shown in the example of FIG. 2B, QoE test server 30 includes a control unit 80 and interfaces 82A-82N. Control unit 80 may, similar to control unit 40 of DPD 24A, represent one or more processors (not shown in FIG. 2B) that execute software instructions, such as those used to define a software or computer program, stored to a computer-readable storage medium (again, not shown in FIG. 2B), such as a storage device (e.g., a disk drive, or an optical drive), or memory (such as Flash memory, random access memory or RAM) or any other type of volatile or non-volatile memory, that stores instructions to cause a programmable processor to perform the techniques described herein. Alternatively, control unit 80 may represent dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Each of interfaces 82 represents an interface for interfacing with a physical communication medium, such as fiber link 22A and any service provider or customer premesis physical mediums, such as coaxial cable, copper line, CAT5 cable, etc. An interface card (IFC) may comprise one or more of interfaces 82, which in this context may be referred to as ports.

Control unit 80 of QoE test server 30 includes service test module 84. Server test module 84 of control unit 50 represents a module that implements the techniques described in this disclosure to test QoE for delivery of a service (e.g., a service provided by service provider network 16) through service provider network 16 and through customer network 18A. Server test module 84 may provide functionality to QoE test server 30 for performing QoE tests of delivery of network services as well as for storing results of QoE tests as provider stat data 54 (after testing service provider network 16) and/or customer stat data 56 (after testing customer network 18A).

Server test module 84 includes data test module 94, TV test module 96, and voice test module 98, that each perform steps to test QoE for delivery of a respective data service, television service, and voice service on service provider network 16 and customer network 18A. For example, server test module 84 may cause data test module 94 to initiate a data service QoE test and commence operations for performing an IPv4 session (or similarly an FTP session) between QoE test server 30 and DPD 24A by transmitting data packets based on IPv4 to DPD 24A via interface 82B. Likewise, server test module 84 may cause TV test module 96 to initiate and commence operations for performing an IPTV session between QoE test server 30 and DPD 24A by transmitting data packets based on RTSP to DPD 24A via interface 82C. Similarly, server test module 84 may cause voice test module 98 to initiate and commence operations for performing a VoIP session between QoE test server 30 and DPD 24A by transmitting data packets based on RTP to DPD 24A via interface 82D.

Server test module 84 also includes web server module 86. Web server module 86 may display a QoE monitoring website. The QoE monitoring website may also include options and QoE test pages (similar to the DPD QoE test page displayed by website host module 52 of DPD 24A) for displaying network statistics generated from QoE tests performed by QoE test server 30 and DPD 24A on service provider network 16 and customer network 18A. The options may include one or more options for initiating a QoE test of a specific type of network service at a specific network location (e.g., customer network 18A and/or service provider network 16). Server test module 84 may store results of QoE tests as provider stat data 54 and customer stat data 56. Web server module 86 may display network statistics based on this stored data on the QoE test pages such as provider network statistics, customer network statistics, or more easily understood consumer level metrics. The QoE monitoring website displayed by web server module 86 may include a single QoE test page for each DPD 24 connected to service provider network 16.

The QoE monitoring website displayed by web server module 86 may also include a configuration page for modifying parameters of QoE test server 30 or DPD 24A. Control unit 80 and control unit 40 of QoE may configure QoE test server 30 and DPD 24A with the parameters to communicate on service provider network 16 and customer network 18A. From the configuration page, an administrator or operator may also update service modules of control unit 80 and control unit 40 (e.g., data service module 44, tv service module 46, voice service module 48, data test module 94, tv test module 96, and voice test module 98) as profiles for services managed by DPD 24A change or as the service provider offers new services using different protocols via service provider network 16.

Server test module 84 may include an interrupt timer (not shown) that periodically interrupts QoE test server 30 to automatically perform a QoE test of a network service provided through DPD 24A. Server test module 84 may also perform a QoE test upon receiving an initiate test command from the QoE monitoring website displayed by web server module 86 or from another network device via service provider network 16.

During execution of QoE test server 30, web server module 86 may detect a selection of an option displayed on the QoE monitoring website. Server test module 84 may send an initiate test command to DPD 24A (over service provider network 16 via one of interfaces 82) based on the selection and/or server test module 84 may perform a QoE test of a service via service provider network 16 based on the selection.

In the case when server test module 84 sends an initiate test command to DPD 24A based on the selection, web server module 86 of server test module 84 may send the initiate test command via interface 82A, over service provider network 16, to DPD 24A. DPD test module 50 of DPD 24A may receive the initiate test command from QoE test server 30 via interfaces 42A. The initiate test command may include a service identifier that DPD test module 50 may use to determine a service type (e.g, VoIP, IPTV, data, etc.) and a service location (e.g., customer network 18A, service provider network 16, etc.). Based on the service identifier, DPD test module 50 may determine the initiate test command indicates VoIP as the service type and service provider network 16 as the service location.

In response to receiving the initiate test command, DPD test module 50 may initiate a service QoE test of customer network 18A, that includes a series of steps for measuring network statistics, in accordance with the techniques described above in reference to FIG. 2A. Upon completion of the service QoE test DPD 24A may store network statistics measured from the completed QoE test as provider stat data 54 and/or customer stat data 56. DPD test module 50 may transmit provider stat data 54 and/or customer stat data 56 via interface 42A to web server module 86 of QoE test server 30. Web server module 86 of QoE test server 30 may receive provider stat data 54 and/or customer stat data 56 from DPD test module 50 via interface 82A and store provider stat data 54 and/or customer stat data 56 locally within control unit 80. Web server module 86 may display provider stat data 54 and customer stat data 56 on the QoE monitoring website as numerical values (e.g., as network statistics in a table or spreadsheet) and web server module 86 may display provider stat data 54 and customer stat data 56 as consumer level metrics that an average administrator or customer can more easily understand.

For example, upon receipt of the results of the QoE test from DPD 24A, web server module 86 of QoE server 30 may process the provider network statistics and customer network statistics, stored as provider stat data 54 and customer stat data 56, into consumer level metrics so an average administrator or customer can more easily understand the meaning of such data when displayed on a webpage such as the QoE monitoring website. Consumer level metrics processed from the provider stat data 54 and customer stat data 56 may include time to download a digital song, time to download a digital movie, time to initiate a streaming movie, time to download and upload a file, time to download a particular webpage, streaming media quality capability, online gaming experience quality, and differences between quality of service provided by different application service providers. QoE test server 30 may use the same techniques used by DPD 24A, described under FIG. 2A, to determine these consumer level metrics.

As mentioned above, during execution of QoE test server 30, web server module 86 may detect a selection of an option displayed on the QoE monitoring website and server test module 84 may conduct a QoE test of a service via service provider network 16 based on the selection. In this way, server test module 84 of QoE test server 30, and not DPD test module 50 of DPD 24A, may conduct a QoE test for delivery of a service provided via service provider network 16. DPD 24A may act as a test client to QoE test server 30, not just as a test host, as in the case when testing customer network 18A.

Each QoE test conducted by server test module 84 may include a series of steps that server test module 84 may perform to obtain a set of network statistics. The set of network statistics obtained and likewise the steps performed by server test module 84 may vary depending on the service tested. For example, QoE of a VoIP service may depend on network jitter and network latency and QoE of a data service may depend on network latency but not depend on network jitter. A VoIP service QoE test may include steps for testing both network latency and network jitter, while a data service QoE test may include steps for testing network latency but not steps for testing network jitter.

Web server module 86 may detect a selection of an option displayed on the QoE monitoring website. Web server module 86 may determine the selection corresponds to a selection for performing a QoE test from QoE test server 30 of a service via service provider network 16. Web server module 86 may also determine a service type based on the selection. In any event, after web server module 86 processes the selection, test module 84 may conduct a QoE test of the service type via service provider network 16.

Server test module 84 of QoE test server 30 may conduct a voice service (e.g., VoIP) QoE test for delivery of service via service provider network 16. A VoIP service QoE test conducted by QoE test server 30 may include a series of steps for measuring network statistics such as data packet loss percentage, data packet latency and data packet jitter. A VoIP service QoE test of service provider network 16 conducted by QoE test server 30 may include similar steps as a VoIP service QoE test of customer network 18A conducted by DPD 24A. However, as described below in more detail, DPD 24A receives provider query data packets from QoE test server 30 and SP test client module 53 of DPD test module 50 causes DPD 24A to transmit provider reply data packets to QoE test server 30 rather than CN test host module 55 of DPD test module 50 that transmits customer query data packets to CPE 26A or receives customer reply data packets from CPE 26A.

In performing the steps of the VoIP service QoE test of service provider network 16 to measure data packet loss percentage, server test module 84 of QoE test server 30 may cause voice test module 98 to initiate a VoIP session with DPD 24A. Server test module 84 may cause voice test module 98 to transmit a provider query data packet via interface 82A to DPD 24A (e.g., message 72A).

The provider query data packet may include a header and data corresponding to a "ping" or "echo" request. SP test client module 53 of DPD test module 50 may cause voice service module 48 of DPD 24A to acknowledge the VoIP session and may receive message 72A from service provider network 16 via interface 42A. In response, SP test client module 53 of DPD test module 50 may cause voice service module 48 of DPD 24A to transmit a provider reply data packet (e.g., message 72B) via interface 42A that includes a header and data indicating a "reply to ping." Voice test module 98 may receive the provider reply data packet from DPD 24A via interface 82A and determine the provider reply data packet indicates that DPD 24A successfully received the provider query data packet (e.g., message 72A). Voice test module 98 may cause server test module 84 to store the provider query and provider reply data packets as a data packet pair. Server test module 84 may store the data packet pair as provider stat data 54. Server test module 84 may repeat the above process by causing voice test module 98 to transmit a series of provider query data packets and receive a series of provider reply data packets.

Server test module 84 may compare the series of provider query data packets and the series of provider reply data packets stored as provider stat data 54. Server test module 84 may treat each provider query data packet that does not correspond to a provider reply data packet as a lost data packet. Server test module 84 may determine the percentage of lost data packets out of the total provider query data packets transmitted represents the data packet loss percentage of service provider network 16 and store the data packet loss percentage as provider stat data 54.

In performing the steps of the VoIP service QoE test of service provider network 16 initiated above, QoE test server 30 may measure data packet loss percentage. To determine data packet latency, server test module 84 may determine a transmit time associated with when voice test module 98 transmitted each provider query data packet to DPD 24A. Server test module 84 may also determine a receipt time associated with when voice test module 98 received each provider reply data packet from DPD 24A. Server test module 84 may determine a two-way data packet latency for each data packet pair (e.g., each provider query data packet and corresponding provider reply data packet) based on these two times. That is, server test module 84 may determine the two-way data packet latency for a provider query and provider reply data packet pair as the elapsed time from when voice test module 98 transmitted the provider query data packet to when voice test module 98 received the corresponding provider reply data packet.

For example, server test module 84 may determine a provider reply data packet received from DPD 24A arrived at interface 82A one hundred fifty milliseconds after voice test module 98 transmitted a corresponding provider query data packet via the same interface 82A. This time of one hundred fifty milliseconds may represent the two-way data packet latency of service provider network 16 and half of one hundred fifty milliseconds, e.g. seventy-five milliseconds, may represent the "one-way" data packet latency. Server test module 84 may average each one-way latency time for each provider query and provider reply data packet pair to arrive at a data packet latency measurement for service provider network 16. Server test module 84 may store each one-way latency time as provider stat data 54.

In performing the steps of the VoIP service QoE test of service provider network 16 initiated above, QoE test server 30 may measure data packet jitter. To determine data packet jitter, server test module 84 may determine a first one-way data packet latency from one of the series of one-way data packet latencies determined as part of the latency test described above. Server test module 84 may also determine a second one-way data packet latency from a subsequent one of the series of one-way data packet latencies determined above. A difference in the first and second one-way data packet latencies may correspond to the data packet jitter of service provider network 16.

For example, the one-way data packet latency of a first provider query and provider reply data packet pair transmitted between QoE test server 30 and DPD 24A may be one hundred fifty milliseconds. The one-way data packet latency of a second, subsequent, provider query and provider reply data packet pair transmitted between QoE test server 30 and DPD 24A may be two hundred milliseconds. The time difference between the second data packet latency and the first data packet latency (e.g., negative fifty milliseconds) may represent the data packet jitter in this instance of a communication between QoE test server 30 and DPD 24A on service provider network 16. Server test module 84 may store the data packet jitter as provider stat data 54.

Server test module 84 may store each measured network statistic (e.g., latency, jitter, and packet loss percentage) as provider stat data 54 in order to quantify in part, QoE for delivery of the VoIP service received by DPD 24A from service provider network 16. For example, web server module 86 may display these measured provider network statistics from the VoIP service QoE test performed in the above example, on the QoE monitoring website. The QoE test page may include each of latency measurements, jitter measurements, and packet loss percentage measurements as numerical values (e.g., in spread sheet or table form).

An average customer or average support technician may, however, not understand the meaning behind these provider network statistics displayed as numerical values. Therefore, web server module 86 may also display these provider network statistics on the QoE monitoring website as consumer level metrics. For instance, the QoE monitoring website may include a line graph that shows a quality level of the VoIP service, such as a MOS, displayed over time. The line graph may quantify the quality level as ranging in value from zero to ten (e.g., zero indicating poor quality and ten indicating high quality). Each point ranging from zero to ten for a moment of time may represent an output of a function that takes latency measurements, jitter measurements, and data packet loss percentages as inputs over time. In this way, the average customer viewing the QoE monitoring website may understand how the quality of the VoIP service varied over time in easy to interpret line graph form (e.g., consumer metric form).

Server test module 84 of QoE test server 30 may conduct a television service (e.g., an IPTV service) QoE test for delivery of service via service provider network 16. An IPTV service QoE test conducted by QoE test server 30 may include a series of steps for measuring network statistics such as data packet loss percentage, data packet latency and data packet jitter. Similar to the VoIP service QoE test described above, each IPTV service QoE test conducted by QoE test server 30 may include a series of steps that server test module 84 may perform to obtain a set of network statistics. And similar to testing VoIP and IPTV by DPD test module 50 of DPD 24A, server test module 84 may perform similar steps during an IPTV service QoE test as the steps performed as part of the VoIP service QoE test described above.

An IPTV service QoE test of service provider network 16 conducted by QoE test server 30 may include similar steps as an IPTV service QoE test of customer network 18A conducted by DPD 24A. However, as described below in more detail, DPD 24A receives provider query data packets from QoE test server 30 and transmits provider reply data packets to QoE test server rather than transmit customer query data packets to CPE 26A or receive customer reply data packets from CPE 26A.

In performing the steps, of the IPTV service QoE test of service provider network 16, to measure data packet loss percentage, server test module 84 may cause TV test module 96 to initiate an IPTV session with DPD 24A. Server test module 84 may cause TV test module 96 to transmit a provider query data packet via interface 82B to DPD 24A (e.g., message 72C). The provider query data packet may include a header and data corresponding to a "ping" or "echo" request. TV service module 46 of DPD 24A may acknowledge the IPTV session and may receive message 72C from service provider network 16 via interface 42B. In response, DPD 24A may transmit a provider reply data packet (e.g., message 72D) via interface 42B that includes a header and data indicating a "reply to ping." TV test module 86 may receive the provider reply data packet from DPD 24A via interface 82B and determine the provider reply data packet indicates that DPD 24A successfully received the provider query data packet (e.g., message 72C). TV test module 96 may cause server test module 84 to store the provider query and provider reply data packets as a data packet pair. Server test module 84 may store the data packet pair as provider stat data 54. Server test module 84 may repeat the above process by causing TV test module 96 to transmit a series of provider query data packets and receive a series of provider reply data packets.

As with the VoIP service QoE test, server test module 84 may compare the series of provider query data packets with the series of provider reply data packets stored as provider stat data 54 and server test module 84 may treat each provider query data packet that does not correspond to a provider reply data packet as a lost data packet. Server test module 84 may determine the percentage of lost data packets out of the total provider query data packets transmitted represents the data packet loss percentage for IPTV service over service provider network 16 and store the data packet loss percentage as provider stat data 54.

To determine data packet latency as part of the IPTV service QoE test, server test module 84 may perform similar steps as indicated above in determining data packet latency for the VoIP service QoE test described above. For example, server test module 84 may determine a transmit time associated with when TV test module 96 transmitted each provider query data packet to DPD 24A. Server test module 84 may also determine a receipt time associated with when TV test module 96 received each provider reply data packet from DPD 24A. Server test module 84 may determine a two-way data packet latency for each data packet pair and from that determine a one-way data packet latency for each data packet pair. Server test module 84 may average each one-way latency time for each provider query and provider reply data packet pair to arrive at a data packet latency measurement for IPTV service over service provider network 16. Server test module 84 may store each one-way latency time as provider stat data 54.

To determine data packet jitter as part of the IPTV service QoE test, server test module 84 may determine a variation between the one-way data packet latencies determined as part of the latency test steps performed above, similar to determining data packet jitter as part of the VoIP service QoE test. For example, server test module 84 may determine a difference between a first and a second measured one-way data packet latency and the difference may correspond to the data packet jitter of IPTV service on service provider network 16. Server test module 84 may store the data packet jitter measurement for IPTV service over service provider network 16 as provider stat data 54.

Web server module 86 of QoE test server 30 may display the measured provider network statistics from the IPTV service QoE test performed in the above example, on the QoE monitoring website. The QoE monitoring website may include each of latency measurements, jitter measurements, and packet loss percentage measurements as numerical values.

Web server module 86 may also display these provider network statistics on the QoE monitoring website as consumer level metrics so an average customer or average support technician can understand the meaning behind the results of the IPTV QoE test. For instance, the QoE monitoring website may display a line graph showing a quality level of the IPTV service over time (similar to the VoIP quality graph described above) or an MDI value expressed over time. In this way, the average customer may understand how the quality of IPTV service varied over time in easy to interpret line graph form (e.g., consumer metric form). Other example metrics displayed on the QoE monitoring website may include an indication of how quickly a user may change from one channel to the next. For example, the consumer level metrics may include a color bar indicator with green representing time to change a channel as "fast" and red representing time to change a channel as "slow". Web server module 86 may base the channel changing metrics on the IPTV service network latency measurements taken during the IPTV service QoE test.

Server test module 84 of QoE test server 30 may conduct a data service (e.g., a broadband internet service) QoE test for delivery of service via service provider network 16. Similar to the VoIP and IPTV service QoE tests described above, each data service QoE test conducted by QoE test server 30 may include a series of steps for measuring network statistics. In addition to latency, jitter, and packet loss percentage, QoE for a data service may depend on other network characteristics such as download speed, upload speed, streaming audio/video bit rate capacity, and bandwidth utilization. For conciseness and readability, the following description describes a test of these other network characteristics while acknowledging the data service QoE test may also include steps to test jitter, latency, and packet loss.

To determine download speed as part of a data service QoE test of service provider network 16, server test module 84 of QoE test server 30 may cause data test module 94 to initiate a FTP session with DPD 24A. Server test module 84 may cause data test module 94 to transmit one or more provider query data packets via interface 82E to DPD 24A (e.g., message 72E) as part of the FTP session and server test module 84 may store a start time associated with this transmission as provider stat data 54. The start time may represent a time when data test module 84 initiated the FTP session. Message 72E may represent a large data file, for example one gigabyte of data. Depending on the speed of service provider network 16, the size of the file may affect the duration of the download speed test. Too short of a file size and the download speed test may have too short a duration to obtain a reliable measurement. Too large of a file size and the download speed test may have too great a duration such that the download speed test does not finish timely.

SP test client module 53 of DPD test module 50 may cause data service module 44 of DPD 24A to acknowledge the FTP session and may receive message 72E from service provider network 16 via interface 42E. In response, SP test client module 53 of DPD 24A may cause data service module 44 to transmit one or more provider reply data packets (e.g., message 72F) via interface 42E that includes a header and data indicating an "end of file receipt." Data test module 94 may receive the provider reply data packets from DPD 24A via interface 82E and determine the provider reply data packet indicates that DPD 24A successfully received the provider query data packets (e.g., message 72E). Data test module 94 may cause server test module 84 to store an end time as provider stat data 54 associated with a time when data test module 94 received message 72F. Server test module 84 may determine a total transfer time based on the start time and end time stored as provider stat data 54. The transfer time may represent a time to transfer message 72E, e.g. one gigabyte of data, from QoE test server 30 to DPD 24A via service provider network 16. Based on the transfer time and the size of message 72E (e.g., the size of the large data file), server test module 84 may determine the download speed in units of megabits per second. For example, server test module 84 may determine eighty seconds elapsed during the transfer of message 72E, and determine one hundred megabits per second (e.g., one gigabyte of data equals eight thousand megabits of data and therefore eight thousand megabits divided by eighty seconds equals one hundred megabits per second) represents the download speed between QoE test server 30 and DPD 24A on service provider network 16. Server test module 84 may store the download speed as provider stat data 54.

To determine upload speed as part of the data service QoE test of service provider network 16, server test module 84 of QoE test server 30 may cause data test module 94 to initiate a FTP session with DPD 24A for performing the download speed test in reverse. That is, server test module 84 may cause data test module 94 to transmit one or more provider query data packets via interface 82E to DPD 24A as part of the FTP session and server test module 84 may store a start time associated with this FTP session as provider stat data 54.

SP test client module 53 of DPD test module 50 may cause data service module 44 of DPD 24A to acknowledge this FTP session and may receive the one or more provider query packets from service provider network 16 via interface 42E. In response, SP test client module 53 of DPD test module 50 may cause data service module 44 of DPD 24A to transmit one or more provider reply data packets via interface 42E that represent the large data file received during the download speed test. Data test module 94 may receive the provider reply data packets from DPD 24A via interface 82E and determine the provider reply data packets represent the large data file along with an indication that DPD 24A completed transferring the large data file. Data test module 94 may cause server test module 84 to store an end time associated with this FTP session. In other words, the end time associated with this FTP session may represent a time when data test module 94 finished receiving the large data file. Server test module 84 may determine a total transfer time based on the start time and end time of this FTP session and store the total transfer time as provider stat data 54. The transfer time may represent a time to transfer the large file (e.g., one gigabyte of data, from DPD 24A to QoE test server 30 via service provider network 16). Similar to determining the download speed above, server test module 84 may use the transfer time and size of the large file to determine the upload speed between DPD 24A and QoE test server 30 on service provider network 16. For example, server test module 84 may determine one hundred sixty seconds elapsed during the transfer of the large file, and determine fifty megabits per second (e.g., one gigabyte of data equals eight thousand megabits of data and therefore eight thousand megabits divided by one hundred sixty seconds equals fifty megabits per second) represents the upload speed between DPD 24A and QoE test server 30 on service provider network 16. Server test module 84 may store the upload speed as provider stat data 54.

To determine audio/video bit rate capacity of the data service as part of the data service QoE test, server test module 84 may simply determine the download speed measured during the download speed test represents the maximum audio/video bit rate capacity sustainable between QoE test server 30 and DPD 24A. That is, based on the above example, server test module 84 may determine the audio and video bit rate capacity of service provider network 16 is one hundred megabits per second.

To determine bandwidth utilization as part of the data service QoE test of service provider network 16, server test module 84 of QoE test server 30 may cause data test module 94 to initiate several upload and download FTP sessions over time with DPD 24A (similar to the upload and download FTP sessions initiated during the speed tests described above). Server test module 84 may store a download and upload bit rate measured for each session as provider stat data 54. From these measured bit rates, server test module 84 may determine an average upload and download bandwidth utilization of the data service received by DPD 24A on service provider network 16. For example, QoE test server 30 and DPD 24A may perform several FTP session file transfers. Server test module 84 may determine an average download bit rate from these transfers as five megabits per second. Server test module 84 may determine an average upload bit rate from these transfers as two and one half megabits per second. Server test module 84 may query data test module 94 for values indicating the maximum upload and download bit rates supported by the data service via service provider network 16 (e.g., ten megabits per second download and five megabits per second upload). Server test module 84 may determine an average upload bandwidth utilization for the data service received by DPD 24A is fifty percent (e.g., two and one half megabits per second divided by five megabits per second) and may determine an average download bandwidth utilization for the data service received by DPD 24A is also fifty percent (e.g., five megabits per second divided by ten megabits per second). Server test module 84 may store the average bandwidth utilizations as provider stat data 54.

Server test module 84 may store each measured provider network statistics (e.g., latency, jitter, packet drop percentage, download speed, upload speed, streaming audio/video bit rate capacity, and bandwidth utilization) as provider stat data 54 in order to quantify in part, QoE for delivery of the data service received by DPD 24A from service provider network 16. For example, web server module 86 of QoE test server 30 may display these measured provider network statistics from the data service QoE test performed in the above example, on the QoE monitoring website. For instance, the QoE monitoring website may include each of latency measurements, jitter measurements, packet loss percentage measurements, download speed, upload speed, streaming audio/video bit rate capacity, and bandwidth utilization displayed as numerical values.

An average customer or average support technician may, however, not understand the meaning behind these provider network statistics displayed as numerical values. Therefore, web server module 86 may also display these provider network statistics on the QoE monitoring website as consumer level metrics. For instance, the QoE monitoring website may include a line graph that shows a quality level of the data service displayed over time (similar to the VoIP and IPTV quality metrics described above). The line graph may quantify the quality level as ranging in value from zero to ten (e.g., zero indicating poor quality and ten indicating high quality). Each point ranging from zero to ten for a moment of time may represent an output of a function that the customer network statistics as inputs over time. In this way, the average customer may understand how the quality of the data service varied over time in easy to interpret line graph form (e.g., consumer metric form).

Rather than display tables or graphs, that an average customer may or may not understand, the QoE monitoring website may also include, as consumer level metrics, answers to common consumer questions. Test server module 84 may base the answers displayed by web server module 86 on the QoE monitoring website on the data recorded from the data service QoE test. For example, consumer level metrics included on the QoE monitoring website may provide information such as: a time to download a high definition (HD) movie, a speed of a file download or a file upload, whether service provider network 16 can stream a HD movie, a time to start viewing a HD movie after initiating a request to stream the HD movie, a time to upload or download a webpage, a difference in quality levels as between two applications running on customer network 18A, and a quality level of game play for a particular game running on customer network 18A. For example, server test module 84 may determine the time displayed by web server module 86, to download a HD movie, based on the download speed measured during the data service QoE test. For example, server test module 84 may determine a size of a HD movie for downloading. By dividing the size of the HD movie with the download speed stored as provider stat data 54, server test module 84 can provide a time in seconds to download the HD movie. Server test module 84 can utilize provider stat data 54 and customer stat data 56 to similarly generate consumer metrics so the average customer can understand results of a data service QoE test.

Web server module 86 may present customer network statistics and/or consumer level metrics as a single QoE measurement for each service received at customer network 18A. Likewise, web server module 86 may present these statistics and metrics as multiple QoE measurements organized according to each CPE involved in the test. For example, the bandwidth utilization of CPE 26A may differ from the bandwidth utilization of CPE different from CPE 26A yet both may be part of customer network 18A. In this way, a customer and/or support technician may understand QoE of a particular service experienced by CPE 26A and not simply QoE of a particular service experienced by all CPE on customer network 18A. For example, DPD 24A may test, and webserver module 86 may present, bandwidth utilization for each CPE on customer network 18A, not just CPE 26A. This may aid a customer support technician and/or customer in troubleshooting a low bandwidth utilization of CPE 26A (e.g., in a case when CPE different from CPE 26A has a high bandwidth utilization that inhibits the bandwidth utilization of CPE 26A).

Figure 3A:
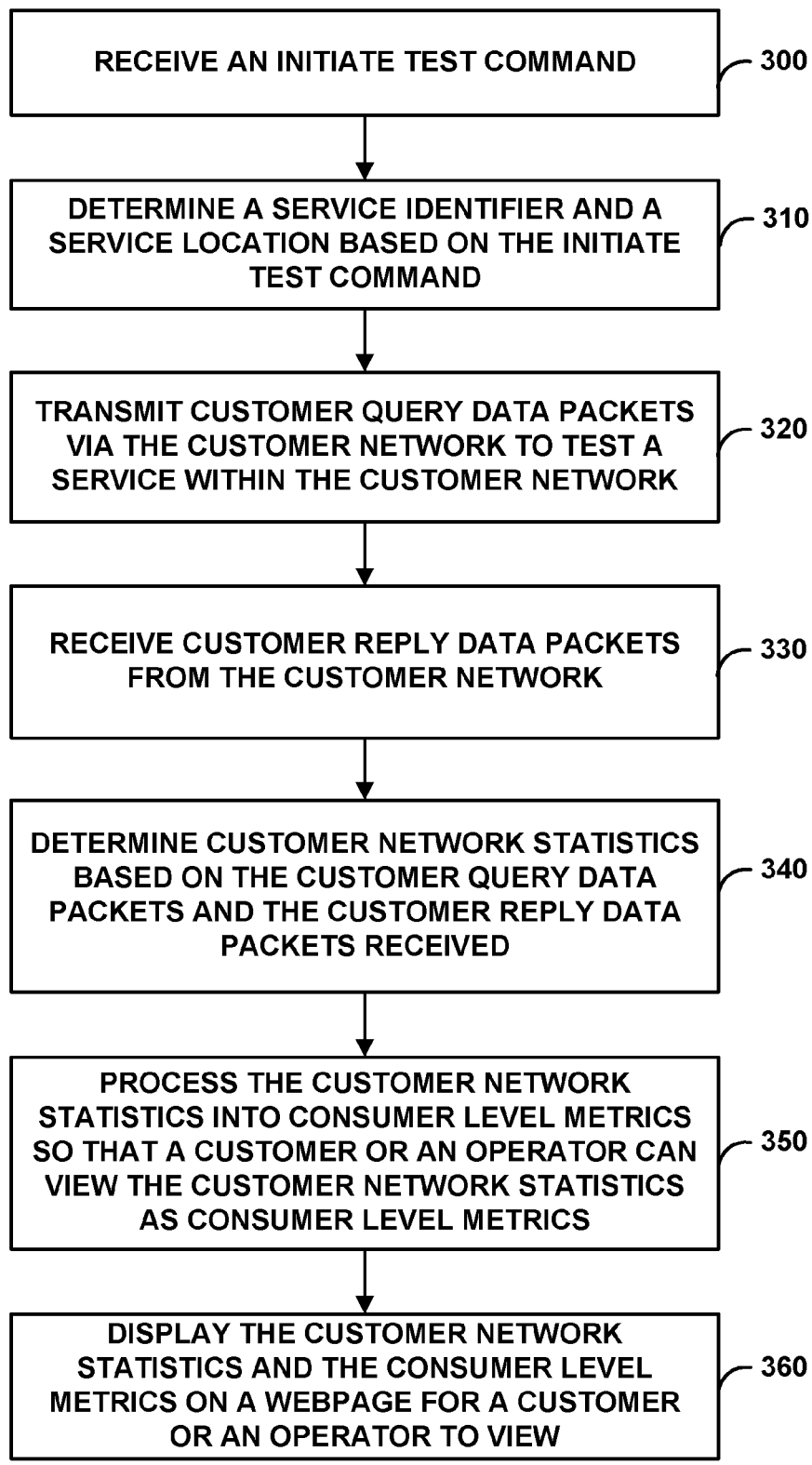
FIGS. 3A-3B are flowcharts illustrating example operations of the demarcation point device and the quality of experience test server shown as part of the network system in the example of FIG. 1.
Figure 3B:
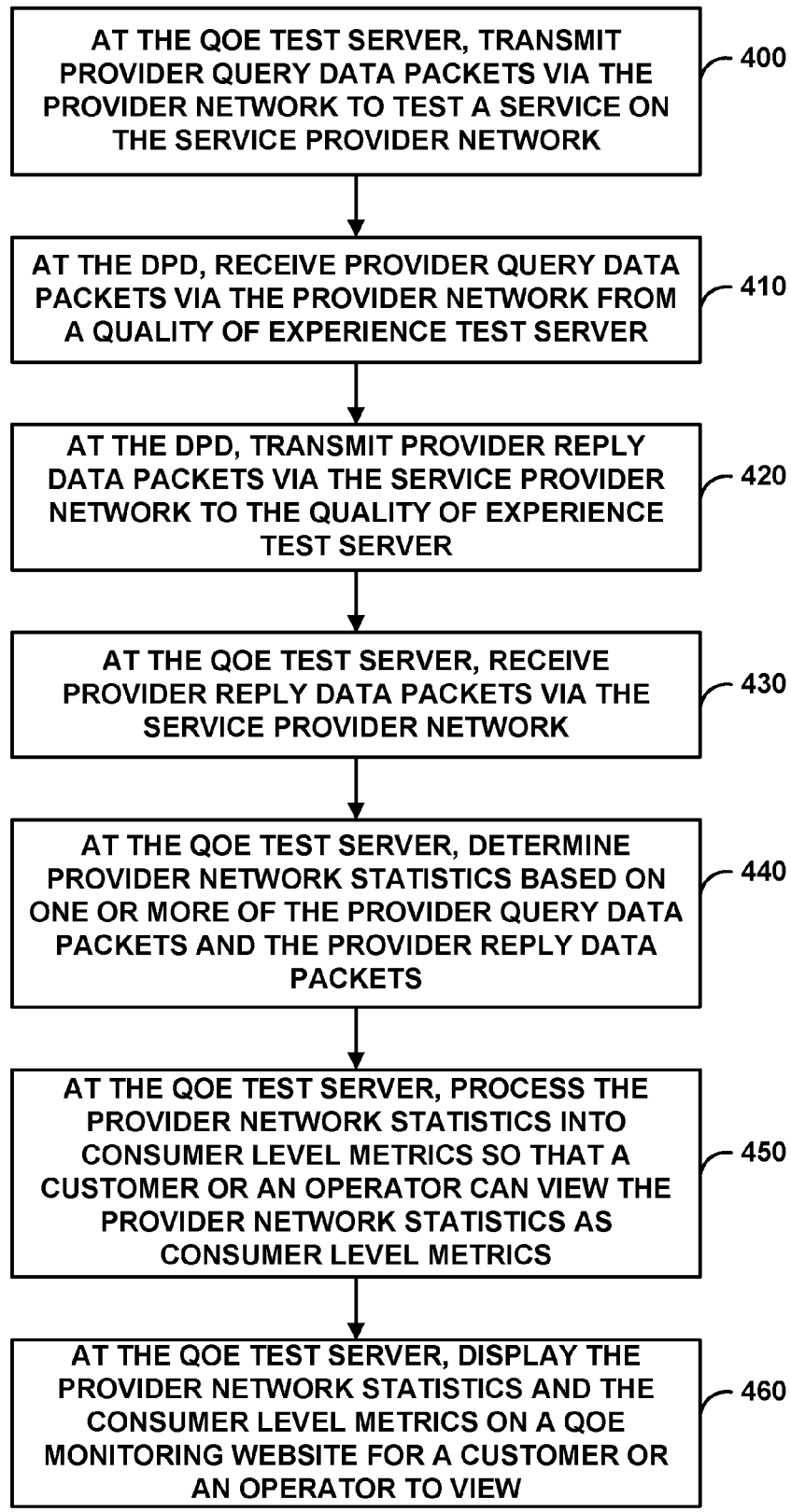

FIGS. 3A-3B are flowcharts illustrating example operations of the demarcation point device and the quality of experience test server shown as part of the network system in the example of FIG. 1. More specifically, FIG. 3A illustrates techniques for testing QoE for delivery of a service through a customer network with a DPD to facilitate troubleshooting of issues with delivery of services provided by a service provider network. FIG. 3B illustrates techniques for testing QoE for delivery of a service through a service provider network with a QoE test server and a DPD as a client test device. For illustrative purposes, the techniques of FIGS. 3A and 3B are described with respect to network 10 as shown in FIG. 1 and DPD 24A, CPE 26A and QoE test server 30 of FIGS. 2A-2B.

With respect to FIG. 3A, as shown in FIG. 1, network 10 includes DPD 24A which communicates with QoE test server 30 via service provider network 16 to provide network services via customer network 18A to CPE 26A. DPD 24A may perform a QoE test of delivery of a service through customer network 18A. DPD 24A may also operate as a client device to QoE test server 30 as QoE test server 30 performs a QoE test of delivery of a service through service provider network 16. To initiate a QoE test using DPD 24A, DPD 24A may receive an initiate test command (300). For example, DPD 24A may receive an initiate test command sent from QoE test server 30 via service provider network 16. QoE test server 30 may send the initiate test command in response to detecting a selection made by an operator on a QoE monitoring website to test QoE for delivery of a television service through customer network 18A, provided via service provider network 16.

DPD 24A may determine a service identifier and a service location based on the initiate test command (310). For example, the operator may select an option on the QoE monitoring website for initiating a QoE test of a particular service at a particular location in network 10. Based on the selection, the initiate test command sent to DPD 24A may include information pertaining to the particular service and particular location selected for testing. From the initiate test command received, DPD 24A may determine the initiate test command corresponds to a request from QoE test server 30 to test QoE for delivery of an IPTV service through customer network 18A.

DPD 24A may transmit customer query data packets via customer network 18 to test at least one service within customer network 18A (320). For example, in testing QoE for delivery of the IPTV service through customer network 18A, DPD 24A may perform a series of steps to determine a series of customer network statistics, such as network latency, network jitter, etc. To test customer network 18A to determine such statistics, DPD 24A may initiate an IPTV session with CPE 26A. As part of the IPTV session initiated with CPE 26A, DPD 24A may transmit customer query data packets based on RTSP via customer network 18A. The customer query data packets may include data corresponding to, for example, a "ping request".

CPE 26A may acknowledge the IPTV session initiated by DPD 24A and receive the customer query data packets. CPE 26A may determine the customer query data packets correspond to a "ping request". In response, CPE 26A may transmit customer reply data packets based on RTSP to DPD 24A via customer network 18A. The customer reply data packets may correspond to a "reply" to the "ping request" sent by DPD 24A.

DPD 24A may receive customer reply data packets from customer network 18A (330). For example, DPD 24A may receive the customer reply data packets sent by CPE 26A. The customer reply data packets may correspond to the "reply" sent by CPE 26A in response to the original "ping request" from DPD 24A.

DPD 24A may determine customer network statistics based the customer query data packets and the customer reply data packets (340). For example, as part of the IPTV service QoE test, DPD 24A may determine a series of customer network statistics associated with the IPTV session across customer network 18A, such as data packet jitter, data packet latency, and data packet loss percentage. DPD 24A may determine a time associated with transmitting the customer query data packets, a time associated with receiving the customer reply data packets, and other data based on the network communication with CPE 26A to determine numeric values associated with the series of customer network statistics.

An average support technician, operator, or customer of the IPTV service may not understand the numeric values associated with the customer network statistics DPD 24A generates from the IPTV session between DPD 24A and CPE 26A. Therefore, DPD 24A may process the customer network statistics so that a customer or an operator can view the customer network statistics as one or more consumer level metrics (350). For example, DPD 24A may generate consumer level metrics for network services such as a time to download a high definition (HD) movie, a speed of a file download or a file upload, whether service customer network 18A can stream a HD movie, a time to start viewing a HD movie after initiating a request to stream the HD movie, a time to upload or download a webpage, a difference in quality levels as between two applications running on customer network 18A, and a quality level of game play for a particular game running on customer network 18A.

DPD 24A may display the customer network statistics and the consumer level metrics on a webpage for a customer or an operator to view (360). For example, DPD 24A may host a DPD webpage user interface that includes a QoE test page for viewing the numerical values of the customer network statistics and/or the consumer level metrics generated by DPD 24A. DPD 24A may also transmit the customer network statistics to QoE test server 30 where the customer network statistics and consumer level metrics so QoE test server 30 can display this data on the QoE monitoring website used by the operator to initiate the IPTV service QoE test.

With respect to FIG. 3B, DPD 24A may operate as a test client device to QoE test server 30, in the case when QoE test server 30 performs a QoE test of delivery of a service through service provider network 16. As described above with respect to FIG. 2B, QoE test server 30 may detect a selection made on a QoE monitoring website hosted by QoE test server 30. Responsive to the selection, QoE test server 30 may initiate a QoE test of a service through service provider network 16. The QoE test server may transmit provider query data packets via service provider network 16 to test a service on service provider network 16 (400). For example, in testing QoE for delivery of the IPTV service through service provider network 16, QoE test server 30 may perform a series of steps to determine a series of provider network statistics, such as network latency, network jitter, etc. To test service provider network 16 to determine such statistics, QoE test server 30 may initiate an IPTV session with DPD 24A. As part of the IPTV session initiated with DPD 24A, QoE test server 30 may transmit provider query data packets based on RTSP via provider network 16. The provider query data packets may include data corresponding to, for example, a "ping request".

DPD 24A may acknowledge the IPTV session initiated by QoE test server 30. DPD 24A may receive the provider query data packets via the provider network from QoE test server 30 (410). DPD 24A may determine the provider query data packets correspond to a "ping request". In response, DPD 24A may transmit provider reply data packets via service provider network 16 to QoE test server 30 (420). For example, in response to receiving the ping request, DPD 24A may transmit provider reply data packets based on RTSP to QoE test server 30 via customer network 16. The provider reply data packets may correspond to a "reply" to the "ping request" sent by QoE test server 30.

QoE test server 30 may receive provider reply data packets from service provider network 16 (430). For example, QoE test server 30 may receive the provider reply data packets sent by DPD 24A. The provider reply data packets may correspond to the "reply" sent by DPD 24A in response to the original "ping request" from QoE test server 30.

QoE test server 30 may determine provider network statistics based the provider query data packets and the provider reply data packets (440). For example, as part of the IPTV service QoE test, QoE test server 30 may determine a series of provider network statistics associated with the IPTV session across service provider network 16, such as data packet jitter, data packet latency, and data packet loss percentage. QoE test server 30 may determine a time associated with transmitting the provider query data packets, a time associated with receiving the provider reply data packets, and other data based on the network communication with DPD 24A to determine numeric values associated with the series of provider network statistics.

An average support technician, operator, or customer of the IPTV service may not understand the numeric values associated with the provider network statistics QoE test server 30 generates from the IPTV session between QoE test server 30 and DPD 24A. Therefore, QoE test server 30 may process the provider network statistics so that a customer or an operator can view the provider network statistics as one or more consumer level metrics (450). For example, QoE test server 30 may generate consumer level metrics for network services such as a time to download a high definition (HD) movie, a speed of a file download or a file upload, whether service provider network 16 can stream a HD movie, a time to start viewing a HD movie after initiating a request to stream the HD movie, a time to upload or download a webpage, a difference in quality levels as between two applications running on service provider network 16, and a quality level of game play for a particular game running on service provider network 16.

QoE test server 30 may display the provider network statistics and the consumer level metrics on a webpage for a customer or an operator to view (460). For example, QoE test server 30 may host a QoE monitoring webpage for displaying the provider network statistics and consumer level metrics generated by QoE test server 30.

FIG. 4 is an example illustration of a webpage of a quality of experience monitoring website hosted by the quality of experience test server shown as part of the network system in the example of FIG. 1. As described above, QoE test server 30 may host a QoE monitoring website 500. QoE monitoring website 500 may include options and QoE test pages for running QoE tests and displaying network statistics/consumer level metrics following these QoE tests. QoE monitoring website 500 includes graphical elements 510-530. QoE monitoring website 500 is one example of a QoE monitoring website and many variations of QoE monitoring website 500 exist. As described above with respect to FIG. 2A, DPD 24A may invoke website host module 52 to present a DPD webpage user interface that may appear similar to the QoE monitoring website hosted by the QoE test server shown in FIG. 4.

Graphical element 510 is an example section of QoE monitoring website 500 for initiating a QoE test of a service on either service provider network 16 or customer network 18A. As shown, graphical element 510 includes options for selection the network and the service to test. An operator may initiate a QoE test by selecting options included in graphical element 510 and clicking on an initiate test button, also included in graphical element 510.

Graphical element 520 is an example section of QoE monitoring website 500 for displaying network statistics generated from a QoE test. As an example, graphical element 520 shows network statistics (both customer network statistics and provider network statistics) displayed in table form and divided by category and network. In addition, graphical element 520 illustrates an example QoE monitoring website 500 that presents network statistics per CPE. For example, bandwidth utilization is presented as a sum total for the entire customer network, and to facilitate trouble shooting further, bandwidth utilization is presented per device on the customer network.

Graphical element 530 is an example section of QoE monitoring website 500 for displaying consumer level metrics generated from the network statistics of graphical element 520. The consumer level metrics provide information about the QoE for a service running on customer network 18A or service provider network 16. The consumer level metrics of graphical element 530 may allow an average customer or network operator to assess the health of the network services provided by the service provider in an easy to understand format.

In some examples, the operations may include receiving, with DPD 24A, one or more provider query data packets via service provider network 16 from QoE test server 30 positioned on service provider network 16 to test service provider network 16. In response to receiving the one or more provider query data packets, the operations may include transmitting, with DPD 24A, one or more provider reply data packets via service provider network 16 to QoE test server 30 so QoE test server 30 can determine one or more provider network statistics based on one or more of the provider query data packets and the provider reply data packets.

In some examples, the one or more customer network statistics and the one or more provider network statistics comprise a data packet loss percentage, a data packet latency, a data packet jitter, a download speed, an upload speed, a streaming audio bit rate, a streaming video bit rate, an upstream bandwidth utilization, and a downstream bandwidth utilization.

In some examples, transmitting the one or more customer query data packets via customer network 18A comprises transmitting the one or more customer query data packets in response to receiving a command to initiate a service test of customer network 18A from one of service provider network 16 and customer network 18A.

In some examples, transmitting the one or more customer query data packets via customer network 18A comprises transmitting the one or more customer query data packets automatically in response to determining by DPD 24A to initiate a service test of customer network 18A.

In some examples, the at least one service comprises one or more of a data service, voice over internet protocol (VoIP) service, and internet protocol television (IPTV) service.

In some examples, the operations may include storing, with DPD 24A, the customer network statistics within control unit 40 of DPD 24A. The operations may further include transmitting, with DPD 24A, the customer network statistics stored within control 40 unit, via service provider network 16.

In some examples, DPD 24A comprises an optical network unit (ONU), an optical node terminal (ONT), an asymmetrical digital subscriber line (ASDL) modem, a very-high-data-rate digital subscriber line (VSDL) modem, a cable modem, a satellite modem, or a mobile broadband modem.

In some examples, the operations may include displaying one or more of the customer network statistics so that one or more of a customer that operates customer network 18A or an operator of service provider network 16 are able to view the customer network statistics.

In some examples, the operations may include sending, the one or more of the customer network statistics to QoE test server 30 via service provider network 16. The operations may further include presenting, the one or more of the customer network statistics on a webpage hosted by QoE test server 30.

In some examples, the operations may include processing, by DPD 24A, the one or more customer network statistics so that one or more of a customer that operates customer network 18A or an operator of service provider network 16 are able to view the customer network statistics as one or more consumer level metrics, wherein the one or more consumer level metrics include time to download a digital song, time to download a digital movie, time to initiate a streaming movie, time to download and upload a file, time to download a particular webpage, streaming media quality capability, online gaming experience quality, and differences between quality of service provided by different application service providers.

The techniques described herein may be implemented in hardware, firmware, or any combination thereof. The hardware may, also execute software. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the techniques described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications.

Various examples have been described. These and other examples are within the scope of the following claims.

The invention claimed is:

1. A method comprising:
   transmitting, with a demarcation point device positioned at a customer network to provide the customer network access to a service provider network, one or more customer query data packets via the customer network to test at least one service within the customer network;
   in response to transmitting the one or more customer query data packets, receiving, with the demarcation point device, one or more customer reply data packets from the customer network; and
   determining, with the demarcation point device, one or more customer network statistics based on one or more of the customer query data packets and the customer reply data packets.

2. The method of claim 1, the method further comprising:
receiving, with the demarcation point device, one or more provider query data packets via the service provider network from a quality of experience test server positioned on the service provider network to test the service provider network;
in response to receiving the one or more provider query data packets, transmitting, with the demarcation point device, one or more provider reply data packets via the service provider network to the quality of experience test server so the quality of experience test server can determine one or more provider network statistics based on one or more of the provider query data packets and the provider reply data packets.

3. The method of claim 2, wherein the one or more customer network statistics and the one or more provider network statistics comprise a data packet loss percentage, a data packet latency, a data packet jitter, a download speed, an upload speed, a streaming audio bit rate, a streaming video bit rate, an upstream bandwidth utilization, and a downstream bandwidth utilization.

4. The method of claim 1, wherein transmitting the one or more customer query data packets via the customer network comprises transmitting the one or more customer query data packets in response to receiving a command to initiate a service test of the customer network from one of the service provider network and the customer network.

5. The method of claim 1, wherein transmitting the one or more customer query data packets via the customer network comprises transmitting the one or more customer query data packets automatically in response to determining by the demarcation point device to initiate a service test of the customer network.

6. The method of claim 1, wherein the at least one service comprises one or more of a data service, voice over internet protocol (VoIP) service, and internet protocol television (IPTV) service.

7. The method of claim 1, the method further comprising:
storing, with the demarcation point device, the customer network statistics within a control unit of the demarcation point device; and
transmitting, with the demarcation point device, the customer network statistics stored within the control unit, via the service provider network.

8. The method of claim 1, wherein the demarcation point device comprises an optical network unit (ONU), an optical node terminal (ONT), an asymmetrical digital subscriber line (ASDL) modem, a very-high-data-rate digital subscriber line (VSDL) modem, a cable modem, a satellite modem, or a mobile broadband modem.

9. The method of claim 1, the method further comprising:
displaying one or more of the customer network statistics so that one or more of a customer that operates the customer network or an operator of the service provider network are able to view the customer network statistics.

10. The method of claim 9, wherein displaying the one or more of the customer network statistics comprises:
sending, the one or more of the customer network statistics to a quality of experience test server via the service provider network; and
presenting, the one or more of the customer network statistics on a webpage hosted by the quality of experience test server.

11. The method of claim 1, the method further comprising:
processing, by the demarcation point device, the one or more customer network statistics so that one or more of a customer that operates the customer network or an operator of the service provider network are able to view the customer network statistics as one or more consumer level metrics, wherein the one or more consumer level metrics include time to download a digital song, time to download a digital movie, time to initiate a streaming movie, time to download and upload a file, time to download a particular webpage, streaming media quality capability, online gaming experience quality, and differences between quality of service provided by different application service providers.

12. A demarcation point device positioned at a customer network to provide the customer network access to a service provider network, the demarcation point device comprising:
a control unit that transmits one or more customer query data packets on the customer network to test at least one service within the customer network,
wherein the control unit receives one or more customer reply data packets from the customer network in response to transmitting the customer query data packets, and determines one or more customer network statistics based on one or more of the customer query data packets and the customer reply data packets.

13. The demarcation point device of claim 12, wherein the control unit receives, one or more provider query data packets via the service provider network from a quality of experience test server positioned on the service provider network to test the service provider network;
wherein the control unit, in response to receiving the one or more provider query data packets, transmits one or more provider reply data packets via the service provider network to the quality of experience test server, so the quality of experience test server can determine one or more provider network statistics based on one or more of the provider query data packets and the provider reply data packets.

14. The demarcation point device of claim 13, wherein the one or more customer network statistics and the one or more provider network statistics include a data packet loss percentage, a data packet latency, a data packet jitter, a download speed, an upload speed, a streaming audio bit rate, a streaming video bit rate, an upstream bandwidth utilization, and a downstream bandwidth utilization.

15. The demarcation point device of claim 12, wherein the control unit transmits the one or more customer query data packets in response to receiving a command to initiate a service test of the customer network from one of the service provider network and the customer network.

16. The demarcation point device of claim 12, wherein the control unit transmits the one or more customer query data packets via the customer network automatically in response to a determination made by the control unit to initiate a service test of the customer network.

17. The demarcation point device of claim 12, wherein the at least one service comprises one or more of a data service, voice over internet protocol (VoIP) service, and internet protocol television (IPTV) service.

18. The demarcation point device of claim 12, wherein the control unit stores the customer network statistics within the control unit, and transmits the customer network statistics stored within the control unit via the service provider network.

19. The demarcation point device of claim 12, wherein the demarcation point device comprises an optical network unit (ONU), an optical node terminal (ONT), an asymmetrical digital subscriber line (ASDL) modem, a very-high-data-rate digital subscriber line (VSDL) modem, a cable modem, a satellite modem, or a mobile broadband modem.

20. The demarcation point device of claim 12, wherein the control unit displays one or more of the customer network statistics so that one or more of a customer that operates the customer network or an operator of the service provider network are able to view the customer network statistics.

21. The demarcation point device of claim 12, wherein the control unit sends, the one or more of the customer network statistics to a quality of experience test server via the service provider network to present the one or more of the customer network statistics on a webpage hosted by the quality of experience test server.

22. The demarcation point device of claim 12, wherein the control unit processes the one or more customer network statistics so that one or more of a customer that operates the customer network or an operator of the service provider network are able to view the customer network statistics as one or more consumer level metrics, wherein the one or more consumer level metrics include time to download a digital song, time to download a digital movie, time to initiate a streaming movie, time to download and upload a file, time to download a particular webpage, streaming media quality capability, online gaming experience quality, and differences between quality of service provided by different application service providers.

23. A network system comprising:
   a customer network;
   a service provider network that provides one or more services;
   a demarcation point device positioned at the customer network to provide the customer network access to the service provider network, wherein the demarcation point device includes a control unit that transmits one or more customer query data packets on the customer network to test at least one service within the customer network, receives one or more customer reply data packets from the customer network in response to transmitting the customer query data packets, and determines one or more customer network statistics based on one or more of the customer query data packets and the customer reply data packets; and
   a quality of experience test server positioned at the service provider network, wherein the quality of experience test server includes a control unit that transmits a command to test the at least one service to the demarcation point device via the service provider network, receives the one or more customer network statistics from the demarcation point device, and presenting the one or more customer network statistics on a webpage hosted by the quality of experience test server so that one or more of a customer that operates the customer network or an operator of the service provider network are able to view the customer network statistics.

24. A non-transitory computer readable medium comprising instructions that, when executed, cause one or more processors to:
   transmit, with a demarcation point device positioned at a customer network to provide the customer network access to a service provider network, one or more customer query data packets via the customer network to test at least one service within the customer network;
   in response to transmitting the one or more customer query data packets, receive, with the demarcation point device, one or more customer reply data packets from the customer network; and
   determine, with the demarcation point device, one or more customer network statistics based on one or more of the customer query data packets and the customer reply data packets.

25. The non-transitory computer readable medium of claim 24, further comprising instructions that, when executed, cause the one or more processors to:
   receive, with the demarcation point device, one or more provider query data packets via the service provider network from a quality of experience test server positioned on the service provider network to test the service provider network;
   in response to receiving the one or more provider query data packets, transmit, with the demarcation point device, one or more provider reply data packets via the service provider network to the quality of experience test server so the quality of experience test server can determine one or more provider network statistics based on one or more of the provider query data packets and the provider reply data packets.

26. A demarcation point device comprising:
   means for transmitting, with the demarcation point device positioned at a customer network to provide the customer network access to a service provider network, one or more customer query data packets via the customer network to test at least one service within the customer network;
   in response to transmitting the one or more customer query data packets, means for receiving, with the demarcation point device, one or more customer reply data packets from the customer network; and
   means for determining, with the demarcation point device, one or more customer network statistics based on one or more of the customer query data packets and the customer reply data packets.

27. The demarcation point device of claim 26, further comprising:
   means for receiving, with the demarcation point device, one or more provider query data packets via the service provider network from a quality of experience test server positioned on the service provider network to test the service provider network;
   in response to receiving the one or more provider query data packets, means for transmitting, with the demarcation point device, one or more provider reply data packets via the service provider network to the quality of experience test server so the quality of experience test server can determine one or more provider network statistics based on one or more of the provider query data packets and the provider reply data packets.

28. The demarcation point device of claim 26, further comprising:
   means for storing, with the demarcation point device, the customer network statistics within a control unit of the demarcation point device; and
   means for transmitting, with the demarcation point device, the customer network statistics stored within the control unit, via the service provider network.

29. The demarcation point device of claim 26, further comprising:
   means for displaying one or more of the customer network statistics so that one or more of a customer that operates the customer network or an operator of the service provider network are able to view the customer network statistics.

30. The demarcation point device of claim 26, further comprising:
   means for sending, the one or more of the customer network statistics to a quality of experience test server via the service provider network so that the one or more of the customer network statistics are presented on a webpage hosted by the quality of experience test server.

31. The demarcation point device of claim 26, further comprising:
   means for processing, by the demarcation point device, the one or more customer network statistics so that one or more of a customer that operates the customer network or an operator of the service provider network are able to view the customer network statistics as one or more consumer level metrics, wherein the one or more consumer level metrics include time to download a digital song, time to download a digital movie, time to initiate a streaming movie, time to download and upload a file, time to download a particular webpage, streaming media quality capability, online gaming experience quality, and differences between quality of service provided by different application service providers.

* * * * *